(12) United States Patent  (10) Patent No.: US 8,335,333 B2
Saiki et al.  (45) Date of Patent: Dec. 18, 2012

(54) SPEAKER SYSTEM

(75) Inventors: Shuji Saiki, Nara (JP); Toshiyuki Matsumura, Osaka (JP); Akiko Fujise, Osaka (JP)

(73) Assignee: Panasonic Corporation, Osaka (JP)

( * ) Notice: Subject to any disclaimer, the term of this patent is extended or adjusted under 35 U.S.C. 154(b) by 939 days.

(21) Appl. No.: 12/295,358

(22) PCT Filed: Apr. 2, 2007

(86) PCT No.: PCT/JP2007/057406
§ 371 (c)(1),
(2), (4) Date: Sep. 30, 2008

(87) PCT Pub. No.: WO2007/116859
PCT Pub. Date: Oct. 18, 2007

(65) Prior Publication Data
US 2009/0245562 A1    Oct. 1, 2009

(30) Foreign Application Priority Data
Apr. 3, 2006 (JP) .................................. 2006-102412

(51) Int. Cl.
*H04R 1/20* (2006.01)

(52) U.S. Cl. ....................................................... 381/345

(58) Field of Classification Search .......... 381/165–167, 381/345, 388–389, 148, 151; 181/148, 151
See application file for complete search history.

(56) References Cited

U.S. PATENT DOCUMENTS

| 4,657,108 | A | | 4/1987 | Ward |
| 4,677,019 | A | * | 6/1987 | von Blucher ................. 442/227 |
| 5,446,792 | A | * | 8/1995 | Sango ........................... 381/160 |
| 6,206,999 | B1 | * | 3/2001 | Ritto et al. .................... 156/245 |
| 7,646,098 | B2 | * | 1/2010 | Japp et al. ..................... 257/759 |
| 2004/0251077 | A1 | * | 12/2004 | Wright et al. ................. 181/151 |
| 2007/0165895 | A1 | | 7/2007 | Matsumura et al. |
| 2007/0195982 | A1 | | 8/2007 | Saiki et al. |
| 2007/0286449 | A1 | | 12/2007 | Matsumura et al. |
| 2009/0120715 | A1 | | 5/2009 | Saiki |
| 2009/0316920 | A1 | | 12/2009 | Matsumura et al. |

FOREIGN PATENT DOCUMENTS

| JP | 57194700 A | * 11/1982 |
| JP | 60-500645 | 5/1985 |
| JP | 2004-537938 | 12/2004 |

(Continued)

OTHER PUBLICATIONS

Supplementary European Search Report dated Sep. 21, 2010 in corresponding European Patent Application No. 07740842.5.

(Continued)

*Primary Examiner* — Tuyen Nguyen
(74) *Attorney, Agent, or Firm* — Wenderoth, Lind & Ponack, L.L.P.

(57) ABSTRACT

The speaker system according to the present invention is a speaker system in which a sound is emitted into a closed space from the back surface of a speaker unit, and has characteristic that gas in the closed space is physically adsorbed by a gas adsorber obtained by adding a binder to a porous material including a plurality of grains so as to perform molding. The speaker system according to the present invention is capable of reproducing, even when a small cabinet is used, low frequency sound while suppressing reduction in sound pressure level as compared to a conventional art.

16 Claims, 20 Drawing Sheets

FOREIGN PATENT DOCUMENTS

| WO | 84/03600 | 9/1984 |
|---|---|---|
| WO | 03/013183 | 2/2003 |
| WO | 2005/101894 | 10/2005 |
| WO | 2006/022199 | 3/2006 |
| WO | 2006/035564 | 4/2006 |
| WO | 2006/098158 | 9/2006 |

OTHER PUBLICATIONS

European Office Action issued Jun. 1, 2011 in corresponding European Application No. 07740842.5.

J. Morgan and C.E. Fink, "Binders and Base Materials for Active Carbon: Functions of Sugars, Coal Tar Pitch, Anthracite, and Cellulose," Industrial and Engineering Chemistry, vol. 38, No. 2, 219-228, Feb. 1, 1946.

Material Methods LLC, "Products: Particle Adsorbent Composite," Jan. 1, 2002, Retrieved from the Internet on May 23, 2011 from: http://materialmethods.com/products/products_PACMM.html.

International Search Report mailed May 15, 2007 for International Application No. PCT/JP2007/057406.

* cited by examiner

F I G. 2
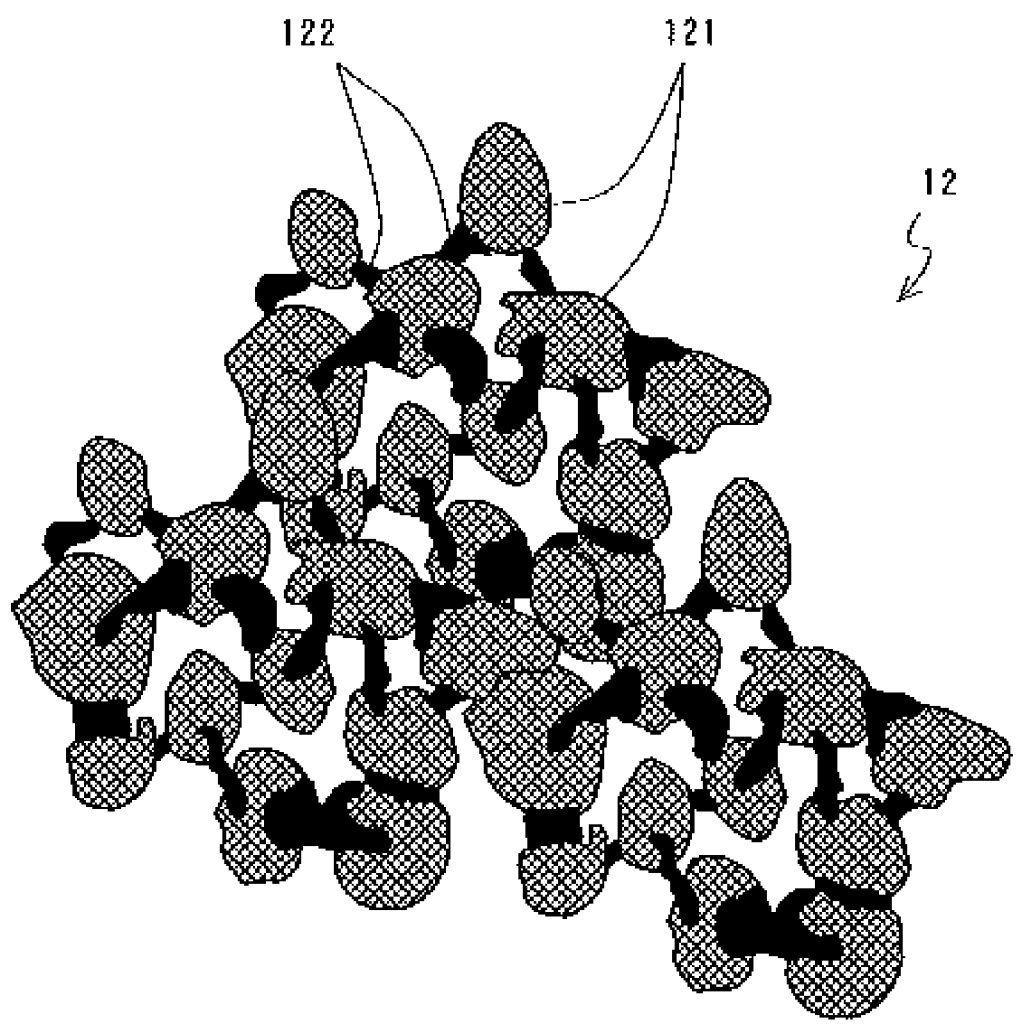

F I G. 4
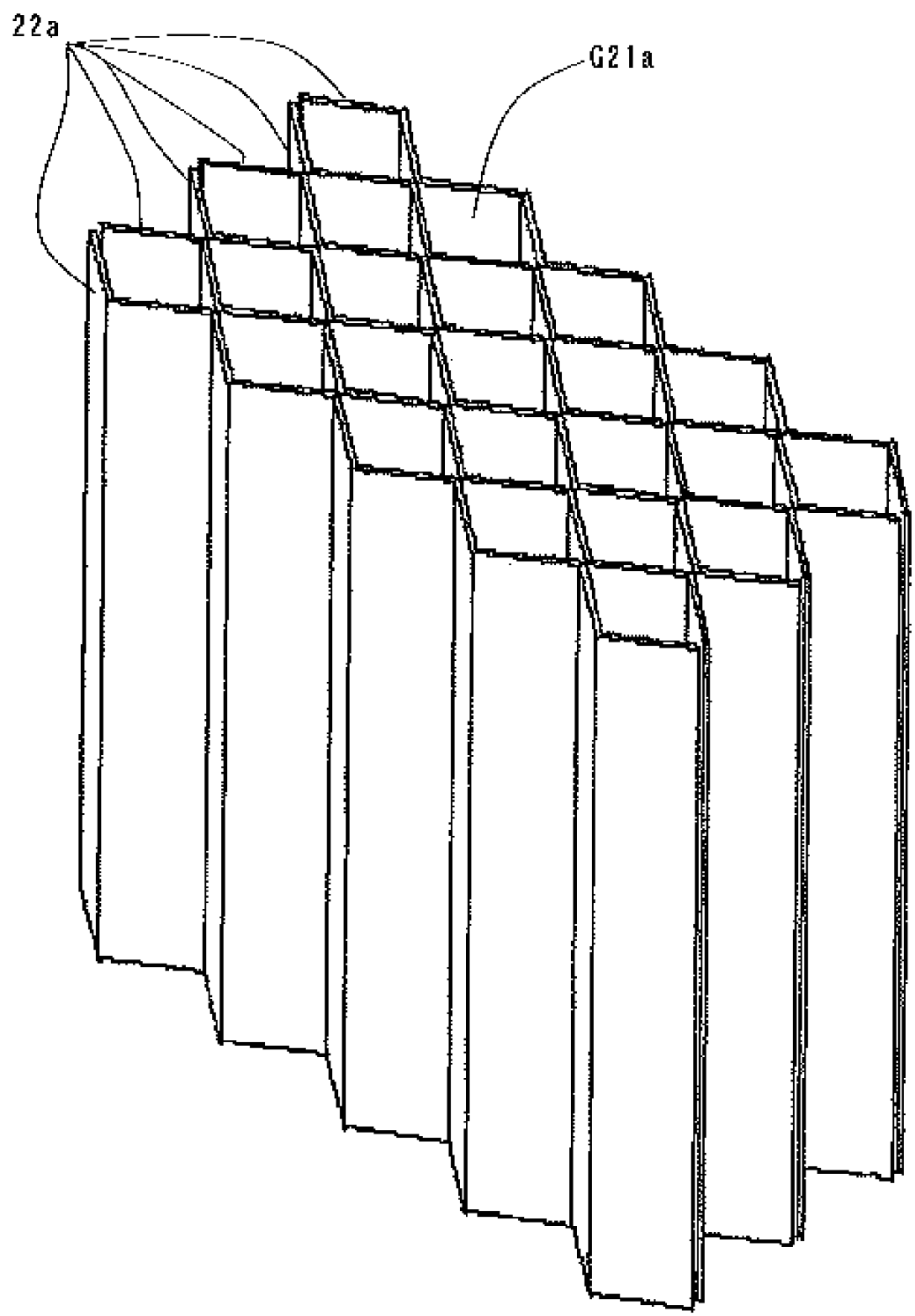

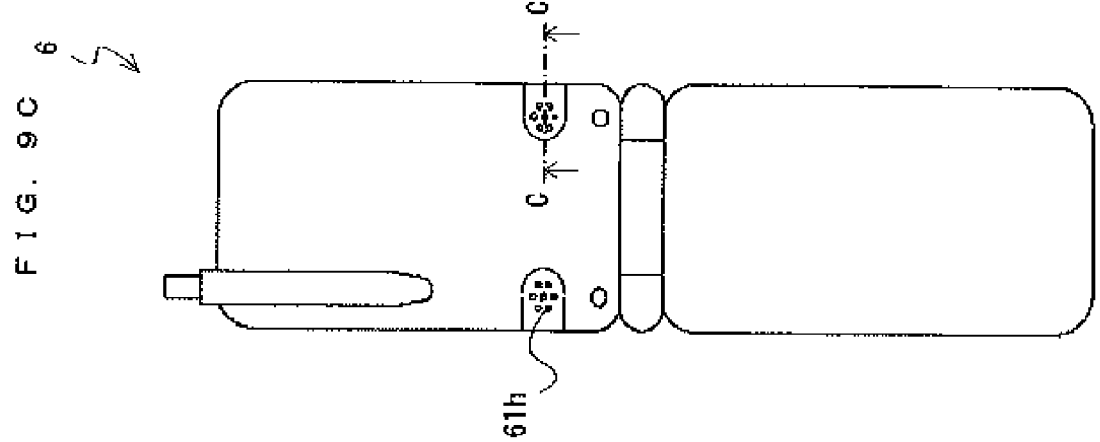
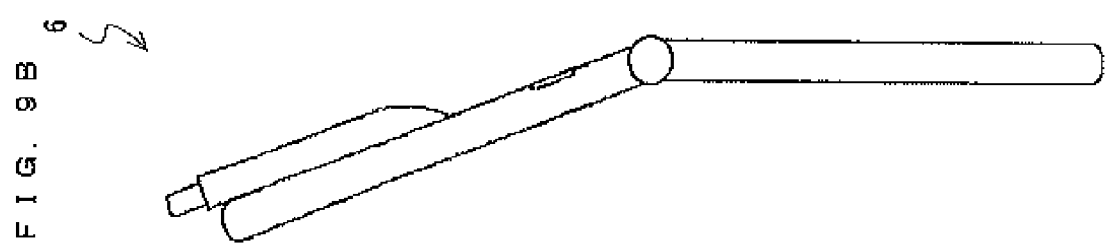
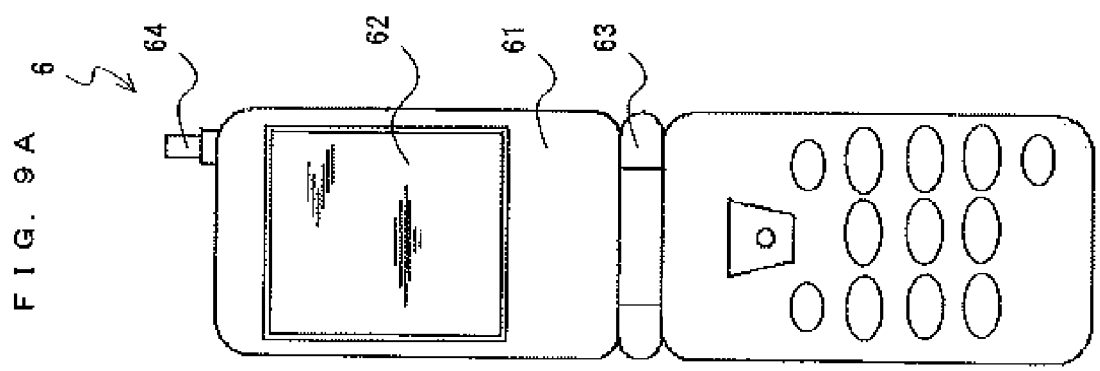

FIG. 15    PRIOR ART
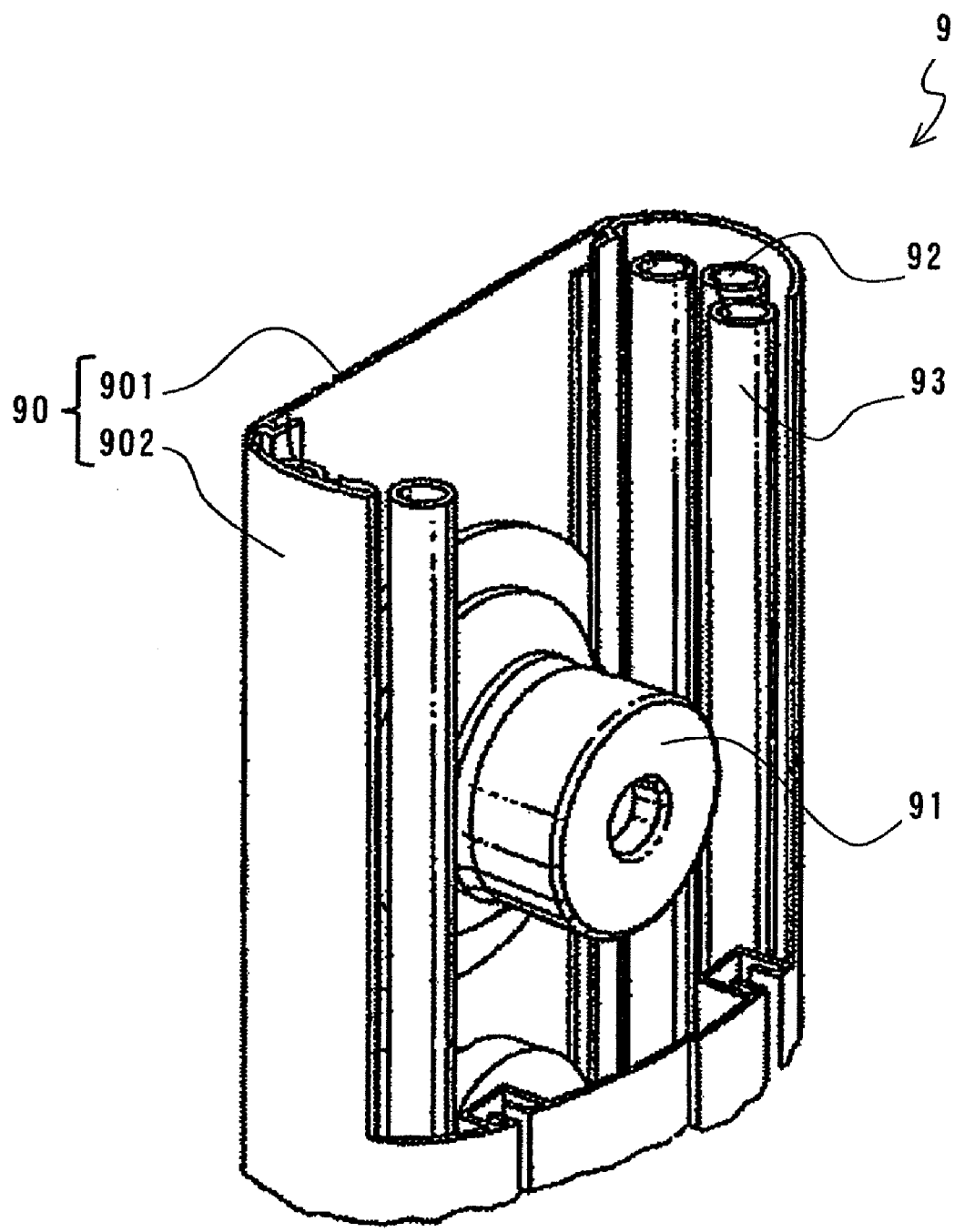

F I G. 1 6   PRIOR ART
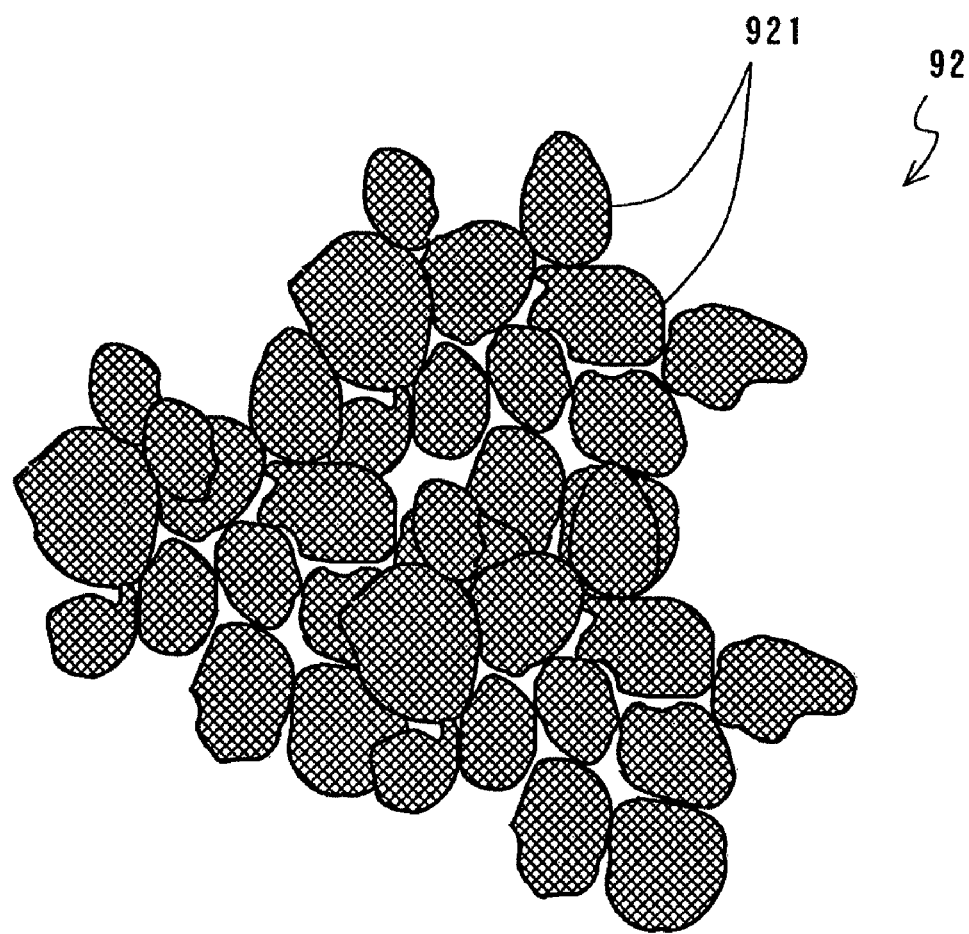

SPEAKER SYSTEM

TECHNICAL FIELD

The present invention relates to a speaker system, and more particularly to a speaker system capable of reproducing low frequency sound even when a small cabinet is used.

BACKGROUND ART

It is difficult for a conventional speaker system using a small cabinet to reproduce low frequency sound because of an influence of acoustic stiffness caused by a space in the cabinet. The limit of low frequency sound reproduction depends on a magnitude of acoustic stiffness, that is, a volume of the cabinet. As means for solving the problem associated with the limit of reproduction, suggested is a speaker device in which a gas adsorber for physically adsorbing gas is provided in the cabinet (for example, refer to Patent Document 1).

FIG. 15 is a partial cross-sectional view illustrating a main portion of a conventional speaker system 9. In FIG. 15, the speaker system 9 includes a cabinet 90, a speaker unit 91, a gas adsorber 92, and bags 93. The cabinet 90 includes a plane-plate shaped front wall 901 and curved side walls 902. The speaker unit 91 is an electrodynamic speaker. Driving force generation means of the speaker unit 91 includes a magnetic circuit and a voice coil. The speaker unit 91 is mounted on the front wall 901. The gas adsorber 92 is simply an activated carbon 921 including a plurality of grains as shown in FIG. 16. FIG. 16 is a diagram illustrating a structure of the conventional gas adsorber 92. The grains of the activated carbon 921 each includes multiple pores, and gas (molecule of gas) is physically adsorbed into the pores. The gas adsorber 92 is enclosed in the bags 93 having a tube shape determined by molding. The bags 93 are positioned in the cabinet 90 in curved portions of the side walls 902.

An operation performed by the speaker system 9 having a configuration as described above will be described. When a music signal is applied to the speaker unit 91, a driving force is generated in the voice coil, and the generated driving force causes a diaphragm to vibrate. Thus, sound is emitted from the front surface and the back surface of the speaker unit 91. The sound emitted from the back surface of the speaker unit 91 changes gas pressure in the cabinet 90. However, the cabinet 90 includes the gas adsorber 92 therein. Therefore, when the gas pressure changes in the cabinet 90, gas is physically adsorbed in the gas adsorber 92 so as to suppress the change in gas pressure. Therefore, the cabinet 90 operates as a cabinet equivalent to a cabinet having a great volume. As described above, in the conventional speaker system 9, the physical adsorption of gas into the gas adsorber 92 is equivalent to an increase of the volume of the cabinet 90. As a result, low frequency sound reproduced by a speaker unit mounted in a large cabinet can be obtained in a small cabinet. Hereinafter, an effect obtained by the equivalent increase in volume of a cabinet is referred to as a volume increase effect.

Patent Document 1: Japanese Translation of PCT international application No. 2004-537938

SUMMARY OF THE INVENTION

Problems to be Solved by the Invention

However, the gas adsorber 92 is simply the activated carbon 921 including a plurality of grains. Therefore, the grains of the activated carbon 921 are closely spaced from each other as shown in FIG. 16, and therefore substantially small spaces are formed among the grains of the activated carbon 921. Further, gas needs to pass through the substantially small spaces so as to reach the grains in the gas adsorber 92. The smaller the space is, the greater acoustic resistance, which is generated while gas passes through the spaces among the grains of the activated carbon 921, is. Accordingly, the gas adsorber 92 has substantially great acoustic resistance, and therefore loss of acoustic energy is increased in the gas adsorber 92. As a result, there is a problem that sound pressure level is substantially reduced, particularly, in a low frequency band, when the gas adsorber 92 is used.

Therefore, an object of the present invention is to provide a speaker system capable of reproducing, even when a small cabinet is used, low frequency sound while suppressing reduction of a sound pressure level as compared to a conventional art.

Solution to the Problems

The present invention is directed to a speaker system, and, in order to attain the object mentioned above, the speaker system according to the present invention is a speaker system in which a sound is emitted from a speaker unit into a closed space, in which a gas adsorber, obtained by adding a binder to a porous material including a plurality of grains so as to perform molding, is used to physically adsorb a gas in the closed space.

In the gas adsorber obtained by adding the binder to the porous material including the plurality of grains so as to perform molding, widened spaces are formed among the grains of the porous material as compared to a conventional gas adsorber including no binder. Therefore, acoustic resistance in the gas adsorber of the present invention is reduced as compared to the conventional art, thereby reducing loss of acoustic energy as compared to the conventional art. As a result, according to the present invention, it is possible to provide the speaker system capable of reproducing, even when a small cabinet is used, low frequency sound while suppressing reduction in sound pressure level as compared to the conventional art.

Preferably, the porous material may be made of one selected from the group consisting of an activated carbon, zeolite, silica ($SiO_2$), alumina ($Al_2O_3$), zirconia ($ZrO_2$), magnesia ($MgO$), iron oxide black ($Fe_3O_4$), molecular sieve, fullerene, and carbon nanotube. Further, the binder may be one of a powdery resin material and a fibrous resin material.

Preferably, the speaker system may comprise a cabinet having the closed space formed therein, and the speaker unit may be mounted in the cabinet, and the gas adsorber may have a predetermined shape determined by the molding, and be positioned inside the cabinet.

Preferably, a plurality of the gas adsorber each having a plane-plate shape determined by the molding may be positioned inside the cabinet, and the plurality of the gas adsorber may be positioned inside the cabinet such that the plurality of the gas adsorber are piled in a thickness direction of the gas adsorber so as to form a gap between any adjacent gas adsorbers among the plurality of the gas adsorber. Therefore, reduction in sound pressure level can be increasingly suppressed.

Preferably, a plurality of the gas adsorber each having a corrugated plate shape determined by the molding may be positioned inside the cabinet, and the plurality of the gas adsorber may be positioned inside the cabinet such that the plurality of the gas adsorber are piled in a direction of an amplitude represented by a wave of the corrugated plate shape so as to form gaps between any adjacent gas adsorbers among the plurality of the gas adsorber. Therefore, reduction in sound pressure level can be increasingly suppressed.

Preferably, the gas adsorber may have a shape determined by the molding such that the gas adsorber is provided along an inner surface of the cabinet and is fixed to the inner surface of the cabinet. Therefore, the volume increase effect can be efficiently enhanced. Further, a projection portion projecting toward an inside of the cabinet may be formed on the inner surface of the cabinet, and the gas adsorber may include one of a through hole and an indentation portion being engageable with the projection portion. Therefore, the gas adsorber can be more stably fixed to the cabinet.

Preferably, a plurality of the gas adsorber having a spherical shape determined by the molding may be positioned inside the cabinet. Therefore, reduction in sound pressure level can be increasingly suppressed. Further, the speaker system may comprise a packing component for collectively packing the plurality of the gas adsorber. Therefore, in the manufacturing process, the packing component having the gas adsorber packed therein can be previously prepared, thereby reducing production cost. Further, the packing component may be made of a gas-shielding material. Therefore, it is possible to prevent deterioration of physical adsorbing function of the gas adsorber according to the present invention.

Preferably, the gas adsorber may form a cabinet having the closed space formed therein, and the speaker unit may be mounted in the cabinet. Therefore, reduction in sound pressure level can be increasingly suppressed. Further, it is advantageous that it is unnecessary to separately provide the gas adsorber. Further, the speaker system may comprise a shielding component positioned on an entire outer surface of the cabinet, for acting as a gas-shielding component. Therefore, it is possible to prevent deterioration of physical adsorbing function of the gas adsorber according to the present invention.

The present invention is also directed to a mobile terminal apparatus, and, in order to attain the object mentioned above, the mobile terminal apparatus according to the present invention comprises the speaker system according to the present invention described above, and a device casing for mounting the speaker system therein.

The present invention is also directed to a vehicle, and, in order to attain the object mentioned above, the vehicle according to the present invention comprises the speaker system according to the present invention described above, and a vehicle body for mounting the speaker system therein.

The present invention is also directed to a video apparatus, and, in order to attain the object mentioned above, the video apparatus according to the present invention comprises the speaker system according to the present invention described above, and a device casing for mounting the speaker system therein.

Effect of the Invention

According to the present invention, it is possible to provide the speaker system capable of reproducing, even when a small cabinet is used, low frequency sound while suppressing reduction of sound pressure level as compared to a conventional art.

BRIEF DESCRIPTION OF THE DRAWINGS

FIG. 2 is a diagram illustrating a structure of a gas adsorber 12.

FIG. 4 is a perspective view of a gas adsorber 22a having a corrugated-plate shape determined by molding.

FIG. 9A is an elevation view of a mobile telephone 6.

FIG. 9B is a side view of the mobile telephone 6.

FIG. 9C is a back view of the mobile telephone 6.

FIG. 15 is a partial cross-sectional view illustrating a main portion of a conventional speaker system 9.

FIG. 16 is a diagram illustrating a structure of a conventional gas adsorber 92.

DESCRIPTION OF THE REFERENCE CHARACTERS

Figure 1A:
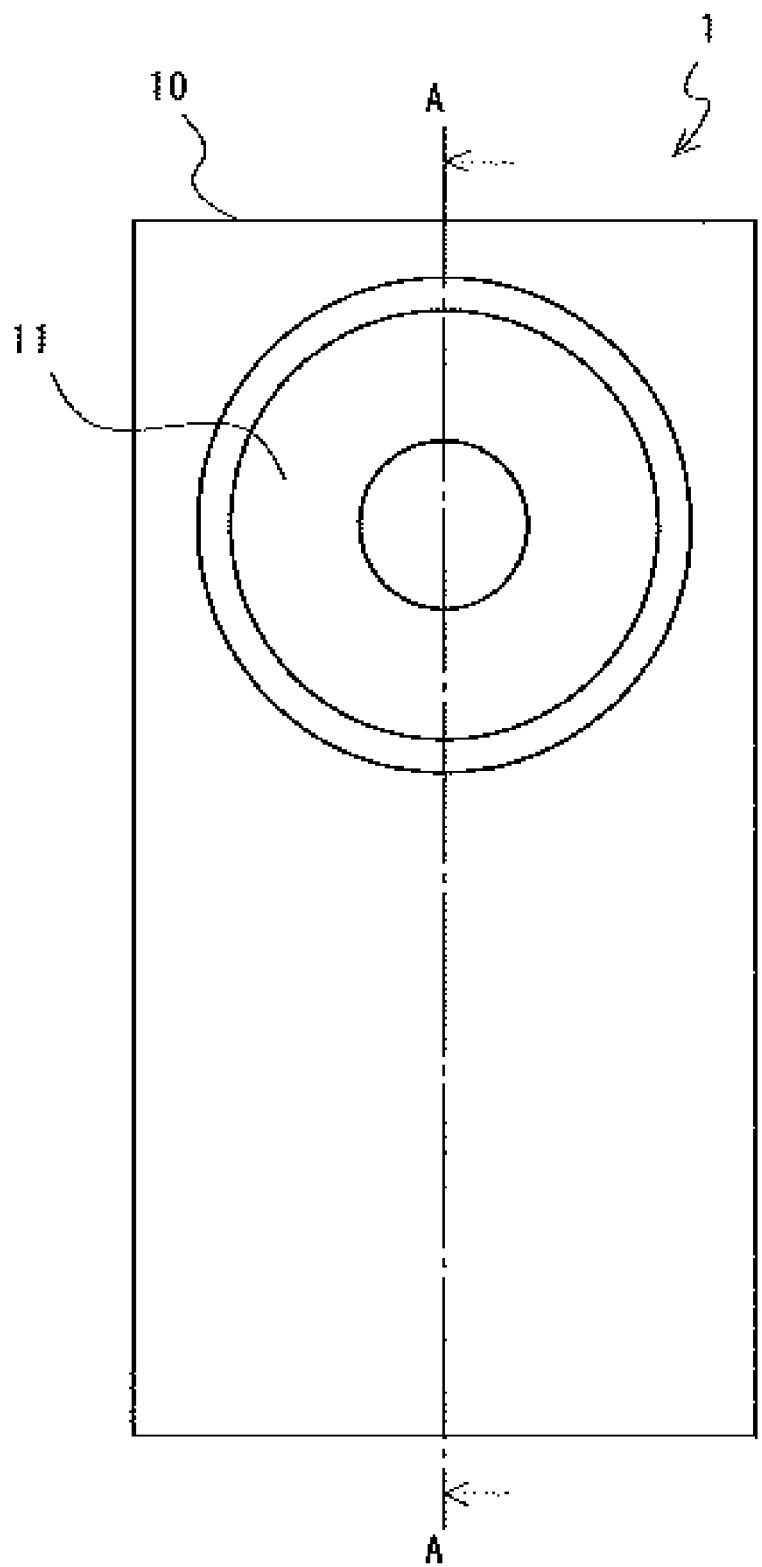
FIG. 1A is an elevation view of a speaker system 1 according to a first embodiment.

1, 2, 3, 4, 5, 82 speaker system
10, 20, 30, 40, 50, 65, 721, 820 cabinet
11, 21, 31, 41, 51, 66, 722, 821 speaker unit
12, 22, 22a, 52, 67, 728, 823 gas adsorber
121 activated carbon
122 binder
23, 729 supporting component
33 passive radiator
331 suspension
332, 665 diaphragm
43 shielding component
431 front surface section
402, 432, 8202 box section
401, 8201 front wall section
53 packing component
6 mobile telephone
61 device casing
62, 80 liquid crystal screen
63 hinge section
64 antenna
661 yoke 662 magnet
663 plate
664 frame
666 voice coil
667 gasket
668 first dustproof net
669 second dustproof net
7 vehicle door
71 window glass
72 door body
723 inner wall
724 inner panel
725 outer panel
726 acoustic tube
727 grille
8 thin-screen television
81 device casing
822 bass reflex port

DETAILED DESCRIPTION OF THE INVENTION

Hereinafter, embodiments of the present invention will be described with reference to the drawings.

First Embodiment

Figure 1B:
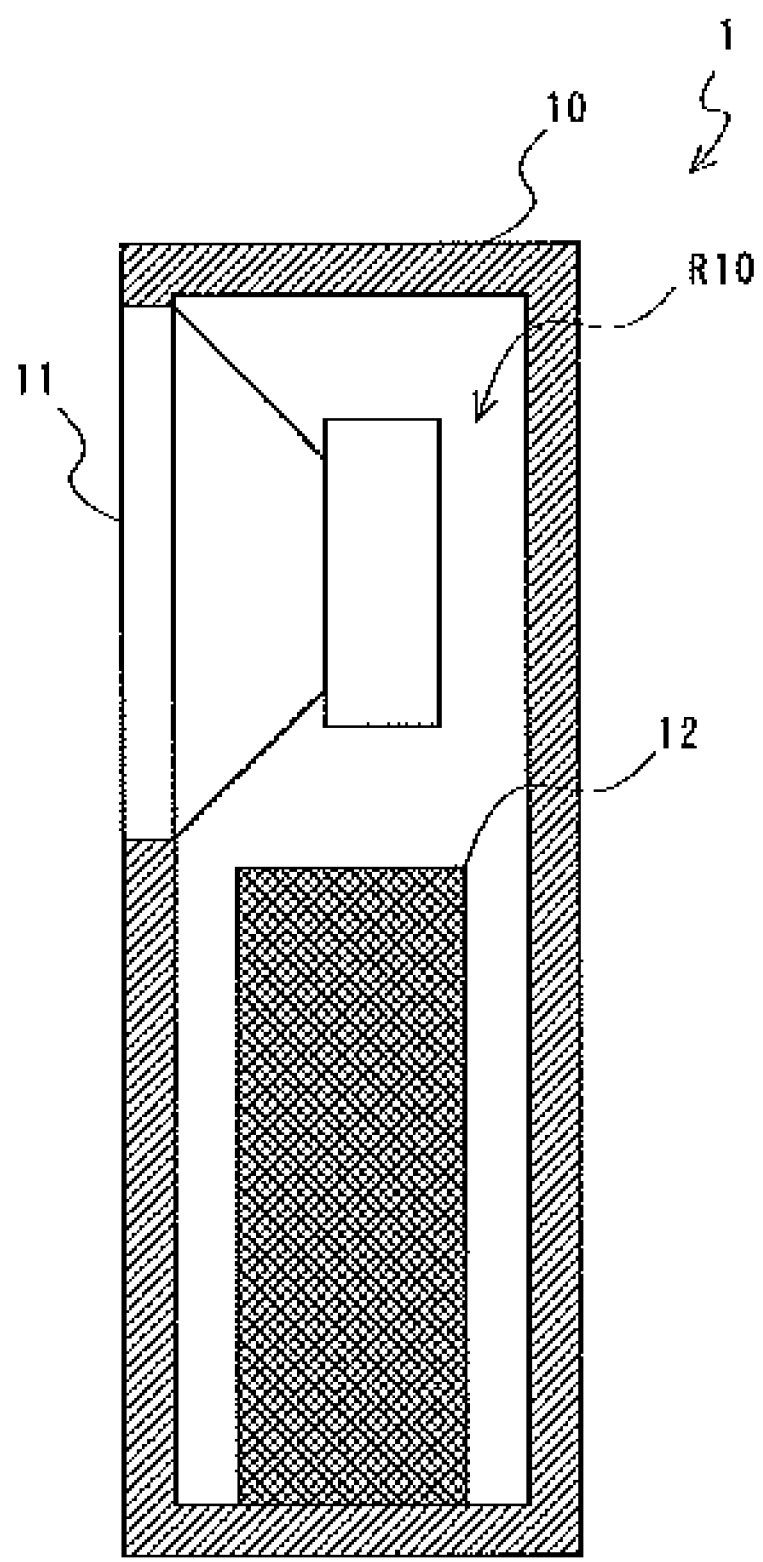
FIG. 1B is a cross-sectional view illustrating the speaker system 1 along lines AA.

A speaker system 1 according to a first embodiment of the present invention will be described with reference to FIG. 1A and FIG. 1B. FIG. 1A is an elevation view of the speaker system 1, and FIG. 1B is a cross-sectional view illustrating the speaker system 1 along lines AA. In FIG. 1A and FIG. 1B, the speaker system 1 comprises a cabinet 10, a speaker unit 11, and a gas adsorber 12. The speaker system 1 is a sealed type speaker.

The speaker unit 11 is, for example, an electrodynamic speaker. Driving force generation means (not shown) of the speaker unit 11 includes a magnetic circuit and a voice coil. The speaker unit 11 is mounted in an opening formed on the front surface of the cabinet 10. The gas adsorber 12, which is positioned in a space R10 inside the cabinet 10, physically adsorbs gas in the space R10. The space R10 is a closed space which is formed inside the cabinet 10.

The gas adsorber 12 includes an activated carbon 121 including a plurality of grains, and a binder (binding component) 122 as shown in FIG. 2. FIG. 2 is a diagram illustrating a structure of the gas adsorber 12. The activated carbon 121 is a porous material including grains each having multiple pores. Gas is physically adsorbed into the pores. A diameter of each grain of the activated carbon 121 is, for example, smaller than or equal to 0.5 mm. The binder is made of resin material such as, for example, polyethylene resin or polyolefin resin. The gas adsorber 12 has any shape obtained by adding powdery binder to the activated carbon 121 including a plurality of grains, and subjecting the activated carbon and the powdery binder to heat treatment, and performing molding. In an example shown in FIG. 1B, the gas adsorber 12 has rectangular parallelepiped shape determined by molding.

The gas adsorber 12 includes the activated carbon 121 including the plurality of grains, and the binder 122 as described above. The grains of the activated carbon 121 are bonded to each other by the binder 122, so that the grains are prevented from being closely spaced from each other. Therefore, spaces formed among the grains of the activated carbon 121 are greater than the spaces shown in FIG. 16. Thus, the gas adsorber 12 is obtained by adding the binder to the activated carbon 121 including the plurality of grains, and performing molding, and therefore the spaces formed in the gas adsorber 12 are greater than the spaces in the conventional gas adsorber 92.

An operation of the speaker system 1 having a configuration as described above will be described. The speaker unit 11 is an electrodynamic speaker, and an operation of the electrodynamic speaker is widely known. Therefore, the operation of the electrodynamic speaker will be briefly described. When a music signal is applied to the speaker unit 11, a driving force is generated in the voice coil, and the generated driving force causes a diaphragm to vibrate. Thus, sound is emitted from the front surface and the back surface of the speaker unit 11. The sound emitted from the back surface of the speaker unit 11 is emitted into the space R10. The emitted sound changes gas pressure in the space R10. However, the cabinet 10 includes the gas adsorber 12 therein. Therefore, when the gas pressure changes in the space R10, gas is physically adsorbed by the gas adsorber 12 so as to suppress the change in gas pressure. Therefore, the cabinet 10 operates as a cabinet equivalent to a cabinet having a great volume. As described above, low frequency sound reproduced by a speaker unit mounted in a large cabinet can be obtained in the speaker system 1 having the small cabinet.

The spaces formed in the gas adsorber 12 are greater than the spaces formed in the conventional gas adsorber 92 as described above. Therefore, acoustic resistance generated in the gas adsorber 12 is smaller than that generated in a conventional art, so that loss of acoustic energy in the gas adsorber 12 is reduced as compared to the conventional art. As a result, reduction of sound pressure level can be suppressed in the gas adsorber 12 as compared to the conventional art.

As described above, the speaker system 1 according to the present embodiment includes the gas adsorber 12 which is obtained by adding the binder to the porous material including the plurality of grains, and performing molding. Thus, it is possible to provide a speaker system capable of reproducing, even when a small cabinet is used, low frequency sound while suppressing reduction of sound pressure level as compared to a conventional art.

Although in the above description the diameter of each grain of the activated carbon 121 is smaller than or equal to 0.5 mm, the present invention is not limited thereto. The diameter of each grain of the activated carbon 121 may be greater than 0.5 mm. The smaller the diameter of each grain of the activated carbon 121 is, the greater the volume increase effect is. Accordingly, it is more preferable that the diameter of each grain of the activated carbon 121 is as small as possible.

Further, although in the above description the activated carbon 121 is used as the porous material, the present invention is not limited thereto. As the porous material, for example, zeolite, silica ($SiO_2$), alumina ($Al_2O_3$), zirconia ($ZrO_2$), magnesia (MgO), iron oxide black ($Fe_3O_4$), molecular sieve, fullerene, carbon nanotube or the like may be used.

Although in the above description the powdery resin material is added as the binder, the present invention is not limited thereto. For example, fibrous resin material may be added as the binder to the porous material including the plurality of grains. In this case, the grains of the porous material sticked to the binder is molded into any shape. Further, as the fibrous resin material, for example, acrylic fiber, polyethylene fiber, polypropylene fiber, polyacrylonitrile fiber, cellulose fiber, nylon fiber, aramid fiber, or the like may be used. Further, although in the above description the mixture ratio between the activated carbon 121 and the binder 122 is not specified, the ratio of the binder 122 is more preferably as small as possible.

Further, although in an example described above the electrodynamic type is used as the driving type for the speaker unit 11, the present invention is not limited thereto. Any driving type, such as a piezoelectric type, an electrostatic type, or an electromagnetic type, for enabling a sound emitted from the diaphragm to change gas pressure in the space R10 of the cabinet 10 may be used. Further, although in FIG. 1B the speaker unit 11 is mounted in the cabinet 10 such that the back surface of the speaker unit 11 faces the space R10, the speaker unit 11 may be mounted in the cabinet 10 such that the front surface of the speaker unit 11 faces the space R10.

The gas adsorber 12 has any shape obtained by adding the binder to the porous material including the plurality of grains, and performing molding. In a second to a fifth embodiments described below, molding is performed such that a gas adsorber having the structure as shown in FIG. 2 has a shape different from the gas adsorber 12. A gas adsorber of each of the following embodiments has the structure as shown in FIG. 2. Accordingly, the gas adsorber of each of the following embodiments has characteristic that the acoustic resistance is reduced as compared to a conventional art, and loss of acoustic energy is reduced as compared to a conventional art, as described for the gas adsorber 12.

Second Embodiment

Figure 3A:
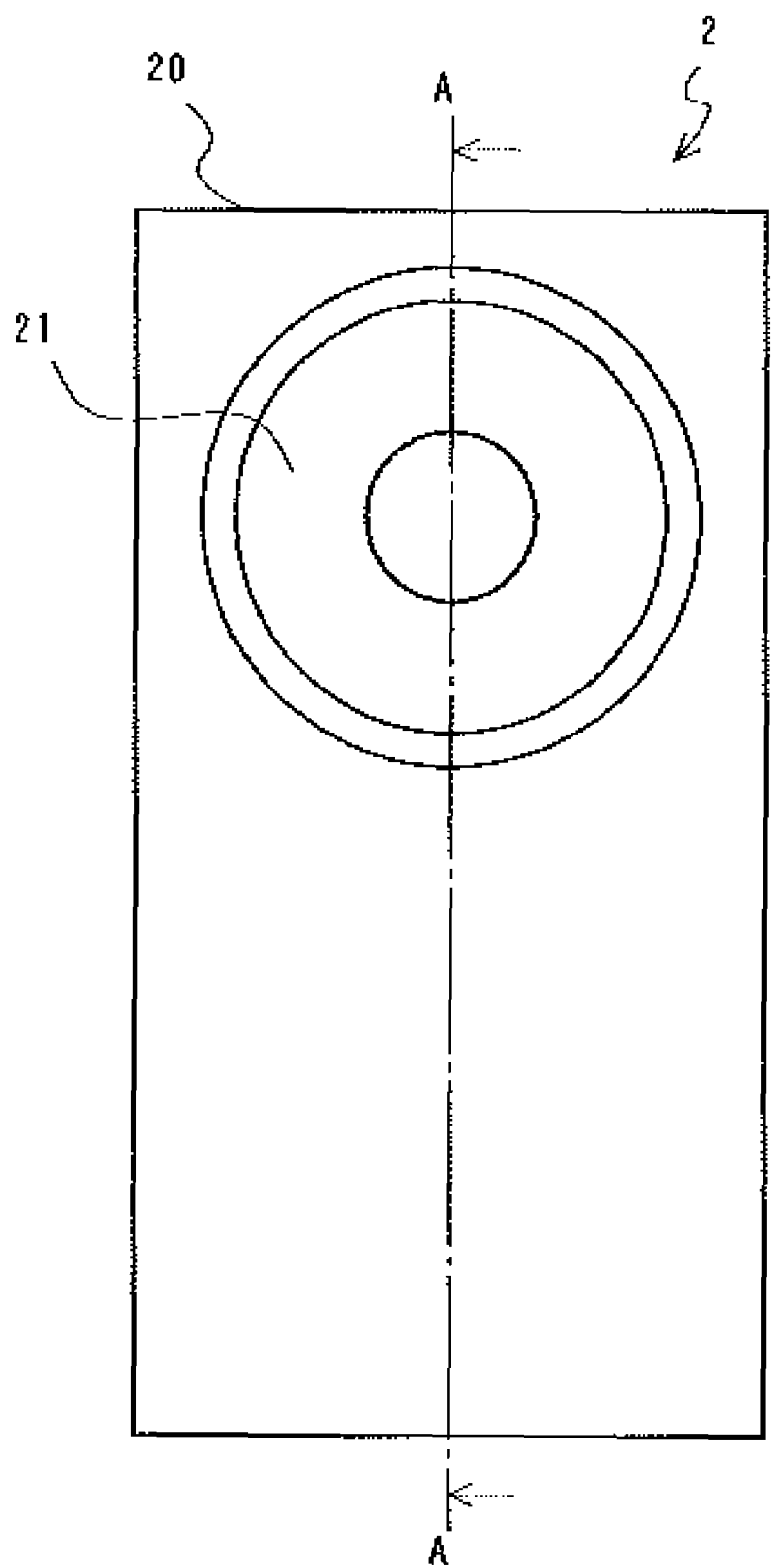
FIG. 3A is an elevation view of a speaker system 2 according to a second embodiment.
Figure 3B:
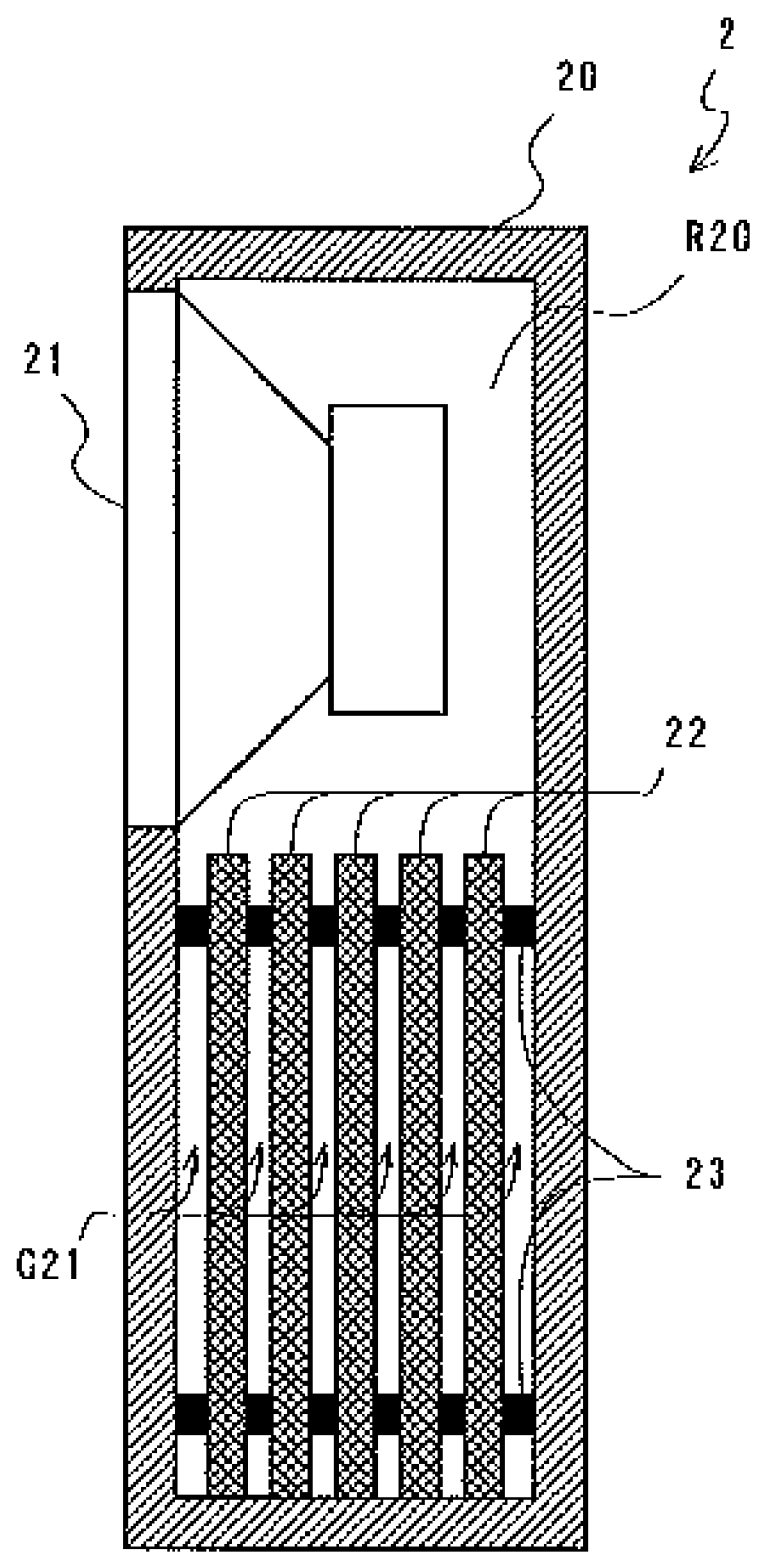
FIG. 3B is a cross-sectional view illustrating the speaker system 2 along lines AA.

A speaker system 2 of a second embodiment of the present invention will be described with reference to FIG. 3A and FIG. 3B. FIG. 3A is an elevation view of the speaker system 2, and FIG. 3B is a cross-sectional view illustrating the speaker system 2 along lines AA. In FIG. 3A and FIG. 3B, the speaker system 2 comprises a cabinet 20, a speaker unit 21, a plurality of gas adsorbers 22, and a plurality of supporting components 23. The speaker system 2 is different from the speaker system 1 of the first embodiment in that in the speaker system 2 the plurality of gas adsorbers 22 are used instead of the gas adsorber 12, and the plurality of supporting components 23 are additionally provided. Hereinafter, the different points will be mainly described.

The speaker unit 21 is, for example, an electrodynamic speaker, as in the case of the speaker unit 11. The speaker unit 21 is mounted in an opening formed on the front surface of the cabinet 20. The plurality of gas adsorbers 22 each has a plane-plate shape determined by molding. The plurality of gas adsorbers 22 are positioned in a space R20 inside the cabinet 20 such that the plurality of gas adsorbers 22 are piled in the thickness direction of the gas adsorbers 22, and a gap G21 is formed between any adjacent gas adsorbers 22. In an example shown in FIG. 3B, five gas adsorbers 22 are provided. The space R20 is a closed space formed inside the cabinet 20. The plurality of supporting components 23 are provided in the upper portion and the lower portion of the gas adsorbers 22. The supporting components 23 support the gas adsorbers 22 so as to form the gap G21 between any adjacent gas adsorbers 22.

An operation performed by the speaker system 2 having a configuration as described above will be described. When a music signal is applied to the speaker unit 21, sound is emitted from the front surface and the back surface of the speaker unit 21. The sound emitted from the back surface of the speaker unit 21 is emitted into the space R20, and passes through the plurality of the gap G21. The sound emitted from the back surface of the speaker unit 21 changes gas pressure in the space R20 including the plurality of the gap G21. However, the cabinet 20 includes the plurality of gas adsorbers 22 therein. Therefore, when the gas pressure changes in the space R20, gas is physically adsorbed by the plurality of gas adsorbers 22 so as to suppress the change in gas pressure. As a result, this is equivalent to increase of the volume of the inside of the cabinet 20.

The plurality of gas adsorbers 22 each has the plane-plate shape determined by molding, and the plurality of the gap G21 are formed among the plurality of gas adsorbers 22. Therefore, the length of a path through which gas in the space R20 reaches the center of the inside of each gas adsorber 22 from the outer surface thereof is reduced as compared to the gas adsorber 12, according to the first embodiment, having the rectangular parallelepiped shape determined by molding. The length of the path represents a distance over which gas passes through clearances, and the longer the length of the path is, the greater the limitation of the movement of gas passing through the clearances is, thereby resulting in attenuation of acoustic energy. Therefore, in the gas adsorbers 22 each having the reduced length of the path as compared to the gas adsorber 12, loss of acoustic energy can be reduced as compared to in the gas adsorber 12. As a result, when the total volume of the plurality of gas adsorbers 22 is equal to the volume of the gas adsorber 12, reduction in sound pressure level is more greatly suppressed in the plurality of gas adsorbers 22 as compared to the gas adsorber 12.

When the total volume of the plurality of gas adsorbers 22 is equal to the volume of the gas adsorber 12, the total area size of a contact surface on which the plurality of gas adsorbers 22 can directly contact gas in the space R20 is greater as compared to the gas adsorber 12, and the length of the path in each gas adsorber 22 is shorter than that in the gas adsorber 12. Accordingly, when the total volume of the plurality of gas adsorbers 22 is equal to the volume of the gas adsorber 12, the plurality of gas adsorbers 22 has the greater area size of the contact surface as compared to the gas adsorber 12, so that reduction in sound pressure level is increasingly suppressed in the plurality of gas adsorbers 22.

As described above, the speaker system 2 according to the present embodiment comprises the plurality of gas adsorbers 22 each having the plane-plate shape determined by molding. Therefore, the speaker system 2 according to the present embodiment is capable of further suppressing reduction in sound pressure level as compared to the speaker system 1 according to the first embodiment.

Although in the above description each gas adsorber 22 is plane-plate shaped, each gas adsorber 22 may be corrugated-plate-shaped as shown in FIG. 4. FIG. 4 is a perspective view of a plurality of gas adsorbers 22a each having a corrugated-plate shape determined by molding. In FIG. 4, the number of the plurality of gas adsorbers 22a provided is six. The front surface of the gas adsorber 22a and the back surface of the gas adsorber 22a alternately contact each other. Specifically, the plurality of gas adsorbers 22a are positioned in the space R20 inside the cabinet 20 such that the plurality of gas adsorbers 22a are piled in the direction of an amplitude represented by a wave of the corrugated-plate shape, and a peak of one of adjacent gas adsorbers 22a contacts a valley of the other of the adjacent gas adsorbers 22a. When the plurality of gas adsorbers 22a each has the corrugated-plate shape determined by molding, and are positioned as shown in FIG. 4, a plurality of gaps G21a are inevitably formed among the plurality of gas adsorbers 22a. That is, the plurality of gas adsorbers 22a are positioned in the space R20 inside the cabinet 20 so as to form gaps G21a between any adjacent gas adsorbers 22a. The plurality of gas adsorbers 22a each has the corrugated-plate shape determined by molding, and therefore the area size of the contact surface on which the plurality of gas adsorbers 22a contact gas is greater as compared to the plurality of gas adsorbers 22. As a result, the length of the path through which gas reaches the center of the inside of each gas adsorber 22a from the outer surface thereof is shorter as compared to the gas adsorbers 22, so that reduction in sound pressure level is increasingly suppressed. Further, the plurality of gaps G21a are formed among the plurality of gas adsorbers 22a, and therefore it is unnecessary to provide the supporting components 23, which are necessary in the example shown in FIG. 3.

Third Embodiment

Figure 5A:
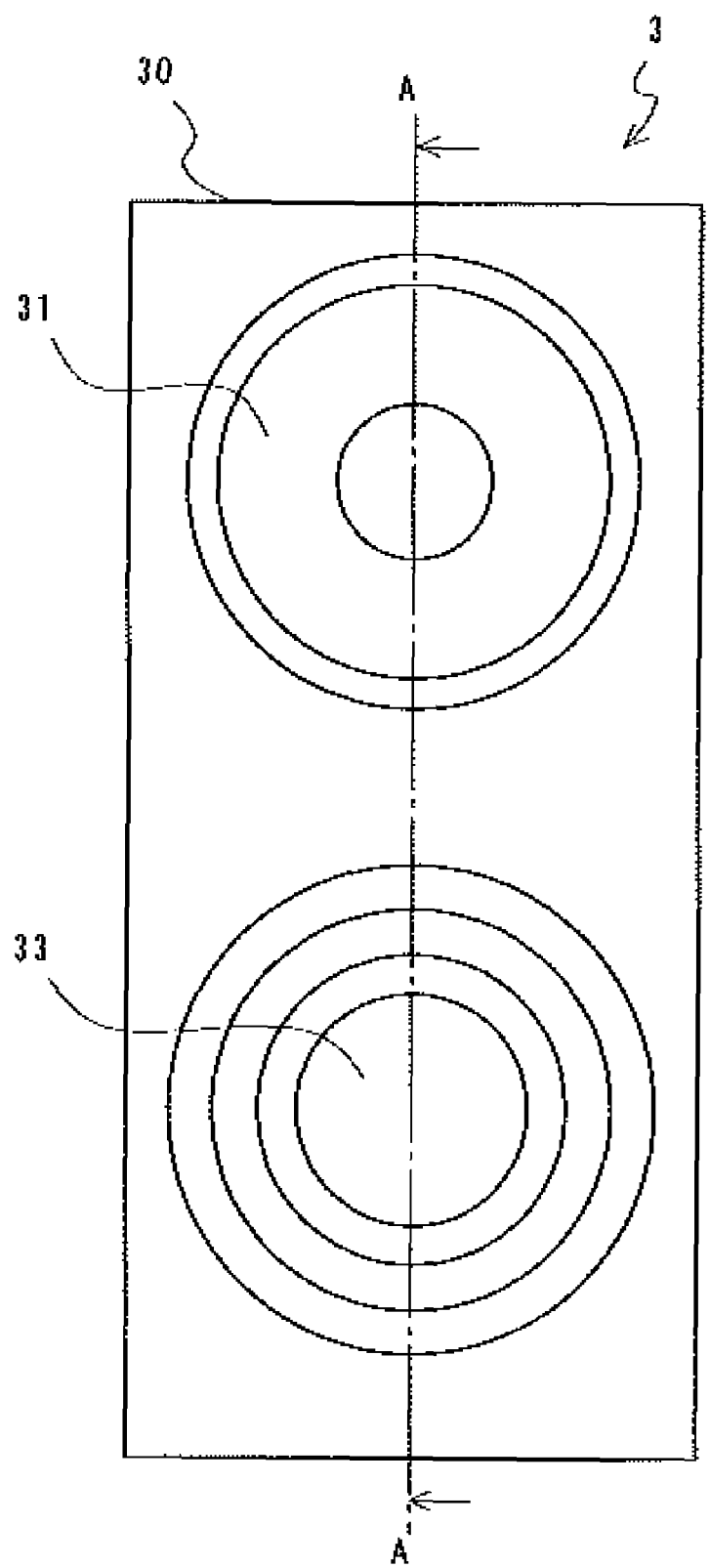
FIG. 5A is an elevation view of a speaker system 3 according to a third embodiment.
Figure 5B:
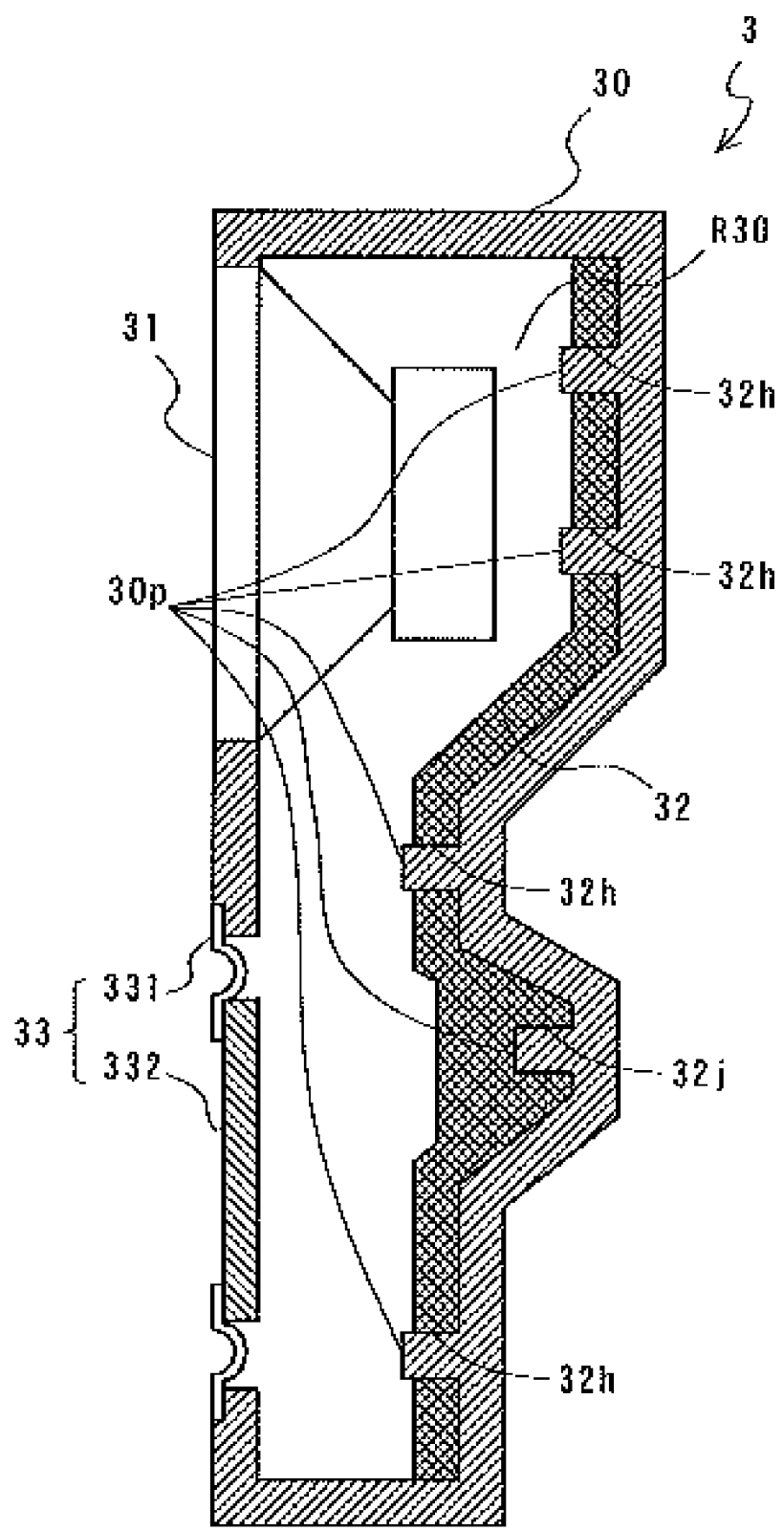
FIG. 5B is a cross-sectional view of the speaker system 3 along lines AA.

A speaker system 3 according to a third embodiment of the present invention will be described with reference to FIG. 5A and FIG. 5B. FIG. 5A is an elevation view of the speaker system 3, and FIG. 5B is a cross-sectional view illustrating the speaker system 3 along lines AA. In FIG. 5A and FIG. 5B, the speaker system 3 comprises a cabinet 30, a speaker unit 31, a gas adsorber 32, and a passive radiator 33. The speaker system 3 is different from the speaker system 1 of the first embodiment in that in the speaker system 3 the back wall of the cabinet 30 has a shape different from that of the cabinet 10, the gas adsorber 32 is used instead of the gas adsorber 12, and the speaker is a phase inversion type speaker using the passive radiator 33 instead of a sealed type speaker. Hereinafter, the different points will be mainly described.

The speaker unit 31 is, for example, an electrodynamic speaker, as in the case of the speaker unit 11. The speaker unit 31 is mounted in an opening formed on the front surface of the cabinet 30. A plurality of projection portions 30p are formed on the back wall of the cabinet 30. The plurality of projection portions 30p are formed on the back wall of the cabinet 30 such that the plurality of projection portions 30p each projects toward the inside of the cabinet 30. The gas adsorber 32 has a shape determined by molding such that the gas adsorber 32 is provided along the inner surface contour of the entire back wall of the cabinet 30. The gas adsorber 32 is fixed to the inner surface of the back wall of the cabinet 30. The gas adsorber 32 has formed thereon through holes 32h and an indentation portion 32j, all of which engage the plurality of projection portions 30p, respectively. The passive radiator 33 includes a suspension 331 and a diaphragm 332. The inner circumference portion of the suspension 331 is mounted to the outer circumference portion of the diaphragm 332, and the outer circumference portion of the suspension 331 is mounted in an opening formed on the front surface of the cabinet 30. A closed space formed inside the cabinet 30 is referred to as a space R30.

An operation performed by the speaker system 3 having a configuration as described above will be described. When a music signal is applied to the speaker unit 31, sound is emitted from the front surface and the back surface of the speaker unit 31. The sound emitted from the back surface of the speaker unit 31 is emitted into the space R30. The sound emitted from the back surface of the speaker unit 31 changes gas pressure in the space R30. However, the cabinet 30 includes the gas adsorber 32 therein. Therefore, when the gas pressure changes in the space R30, gas is physically adsorbed by the gas adsorber 32, so as to suppress the change in gas pressure. As a result, this is equivalent to increase of the volume of the inside of the cabinet 30. In the present embodiment, the phase inversion type speaker using the passive radiator 33 is used, and therefore the reproduction frequency band is widened so as to increase the low frequency band as compared to the speaker system 1 according to the first embodiment.

The gas adsorber which has the plane-plate shape determined by molding, and has the structure shown in FIG. 2, and is fixed to only the plane surface portion of the back wall of the cabinet 30 is compared with the gas adsorber 32 fixed to the entire inner surface of the back wall of the cabinet 30, with respect to the volume of the gas adsorber to be provided in the cabinet 30. The gas adsorber having the plane-plate shape determined by molding is allowed to be fixed to only the plane surface portion of the back wall of the cabinet 30. On the other hand, the gas adsorber 32 can be fixed to the entire inner surface of the back wall of the cabinet 30. Therefore, the gas adsorber 32 is allowed to have an increased size because the gas adsorber can be provided in a portion other than the plane surface portion of the back wall of the cabinet 30. As a result, the volume increase effect can be efficiently enhanced in the gas adsorber 32.

As described above, the speaker system 3 according to the present embodiment comprises the gas adsorber 32 having a shape determined by molding such that the gas adsorber 32 is provided along the inner surface contour of the entire back wall of the cabinet 30. Therefore, even when the cabinet of the speaker system 3 has a complicated shape, the speaker system 3 according to the present embodiment enables the volume increase effect to be enhanced in accordance with the contour.

Further, the gas adsorber 32 has a shape determined by molding such that the gas adsorber 32 is provided along the inner surface contour of the entire back wall of the cabinet 30. When the gas adsorber 32 is formed, by molding, so as to be integrated into one component, the number of times the gas adsorber is fixed is only one, and the number of production steps can be reduced as compared to a case where a plurality of gas adsorbers each having a plane-plate shape determined by molding are fixed to only the plane surface portion of the back wall of the cabinet 30.

Even when the thickness of the gas adsorber 32 is reduced in consideration of the volume increase effect enhanced by the gas adsorber 32, the volume increase effect obtained by using a plurality of gas adsorbers each of which has the structure shown in FIG. 2 and has a plane-plate shape determined by molding can be obtained. Thus, the length of the path through which gas reaches the center of the inside of the gas adsorber 32 from the outer surface thereof can be reduced, thereby reducing loss of acoustic energy. As a result, when the gas adsorber 32 is used, the reduction of sound pressure level can be further suppressed as compared to the plurality of gas adsorbers each having the plane-plate shape determined by molding, and the same volume increase effect as obtained by using a plurality of gas adsorbers each having the plane-plate shape determined by molding is obtained.

Furthermore, the gas adsorber 32 includes through holes 32h and the indentation portion 32j. When the gas adsorber 32 is fixed to the inner surface of the back wall of the cabinet 30, the through holes 32 and the indentations portion 32j engage the projection portions 30p, respectively. Thus, the gas adsorber 32 can be stably fixed to the inner surface of the back wall of the cabinet 30. The gas adsorber 32 may be more stably fixed by, for example, heating and melting the surfaces of the projection portions 30p each including a portion protruding from the gas adsorber 32. For example, when the speaker system 3 is mounted in a vehicle, the gas adsorber 32 may be moved in the cabinet 30 due to the vehicle vibrating. The movement may damage the gas adsorber 32 in the speaker system 3 which is mounted in the vehicle. However, by heating and melting the surfaces of the projection portions 30p, the damage of the gas adsorber 32 can be securely prevented. More preferably, the gas adsorber 32 may be fixed by using an adhesive in addition to the engagement described above.

Although in the above description the gas adsorber 32 includes the through holes 32h merely corresponding to the projection portions 30p, the present invention is not limited thereto. The gas adsorber 32 may additionally include the through holes 32h which do not correspond to the projection portions 30p. The through holes 32h which do not correspond to the projection portions 30p function as paths for passing gas without engaging the projection portions 30p. Therefore, the length of the path through which gas reaches the center of the inside of the gas adsorber 32 from the outer surface thereof is increasingly reduced, thereby increasing reducing loss of acoustic energy. Further, the contact surface of the gas adsorber 32 may not be flat.

Fourth Embodiment

Figure 6A:
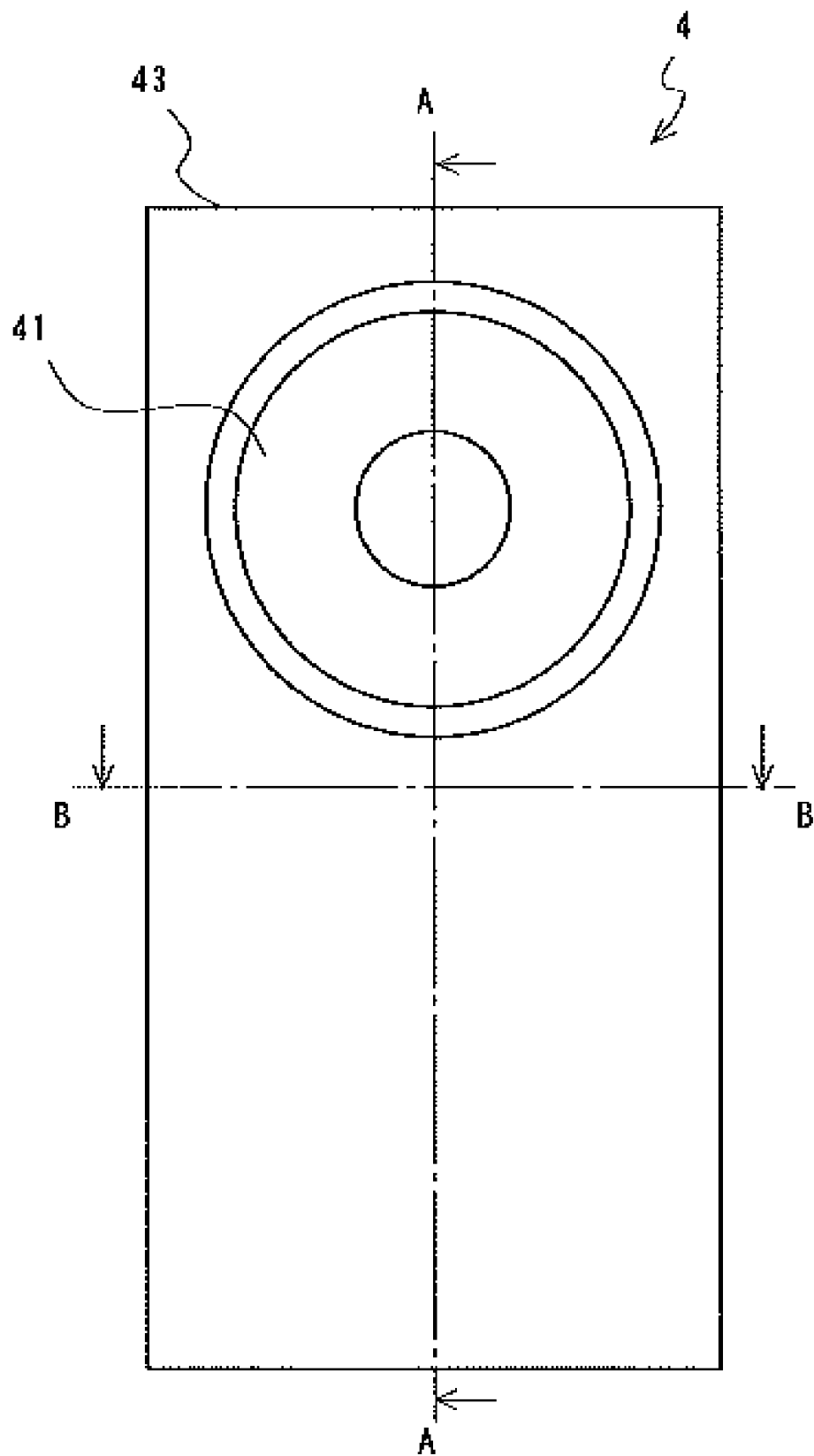
FIG. 6A is an elevation view of a speaker system 4 according to a fourth embodiment.
Figure 6B:
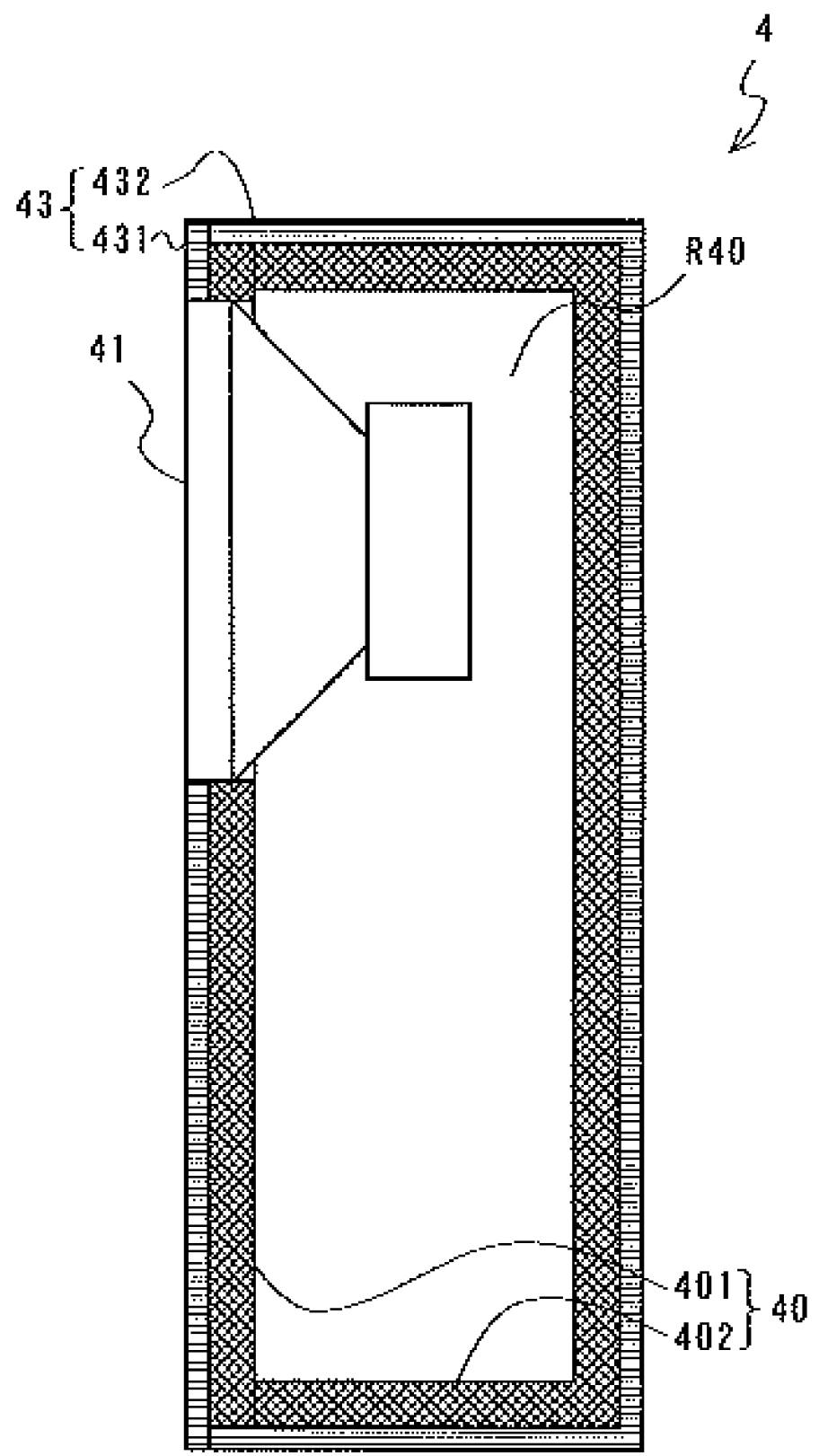
FIG. 6B is a cross-sectional view of the speaker system 4 along lines AA.

A speaker system 4 according to a fourth embodiment of the present invention will be described with reference to FIG. 6A and FIG. 6B. FIG. 6A is an elevation view of the speaker system 4, and FIG. 6B is a cross-sectional view illustrating the speaker system 4 along lines AA. In FIG. 6A and FIG. 6B, the speaker system 4 comprises a cabinet 40, a speaker unit 41, and a shielding component 43. The speaker system 4 is different from the speaker system 1 of the first embodiment in that in the speaker system 4 the gas adsorber having the structure shown in FIG. 2 functions as the cabinet 40, and the shielding component 43 is additionally provided. Hereinafter, the different points will be mainly described.

The speaker unit 41 is, for example, an electrodynamic speaker, as in the case of the speaker unit 11. The speaker unit 41 is mounted in an opening formed on the front surface of each of the cabinet 40 and the shielding component 43. The cabinet 40 includes a front wall section 401 having formed therein the opening for mounting the speaker unit 41, and a box section 402 having side walls and the back wall. The front wall section 401 and the box section 402 are formed by the gas adsorber having the structure shown in FIG. 2. Specifically, the front wall section 401 is produced by molding the gas adsorber into a plane-plate shape, and the box section 402 is produced by molding the gas adsorber into a box shape. The shielding component 43 is made of gas-shielding material and provided over the entire outer surface of the cabinet 40. The shielding component 43 includes a front surface section 431 having formed therein the opening for mounting the speaker unit 41, and a box section 432 having side surfaces and a back surface. The gas-shielding material may be, for example, a film made of metal such as aluminum foil, a film made of resin, having enhanced moisture-proof characteristic, obtained by evaporating silica ($SiO_2$) onto polyethylene sheet, or the like. The gas-shielding material is not limited to a film, and may be coating material having enhanced hermeticity. In this case, the entire outer surface of the cabinet 40 is directly coated with the coating material corresponding to the shielding component 43. The closed space formed inside the cabinet 40 is referred to as a space R40.

An operation performed by the speaker system 4 having a configuration as described above will be described. When a music signal is applied to the speaker unit 41, sound is emitted from the front surface and the back surface of the speaker unit 41. The sound emitted from the back surface of the speaker unit 41 is emitted into the space R40. The sound emitted from the back surface of the speaker unit 41 changes gas pressure in the space R40. The operations described above are the same as described for the first embodiment. The fourth embodiment is different from the first embodiment in that in the fourth embodiment the cabinet 40 is formed by the gas adsorber having the structure shown in FIG. 2. Therefore, when gas pressure changes in the space R40, gas is physically adsorbed by the cabinet 40, so as to suppress the change in gas pressure. Specifically, when gas pressure changes in the cabinet 40, the gas contacts the entire surface of the inner portion of the cabinet 40, that is, the front wall section 401 and the box section 402, and the gas is physically adsorbed by the front wall section 401 and the box section 402. As a result, this is equivalent to increase of the volume of the inside of the cabinet 40.

In the present embodiment, the cabinet 40 is formed by the gas adsorber. Specifically, the cabinet 40 is formed by the gas adsorber having the plane-plate shape determined by molding. Further, the contact surface between gas and the gas adsorber forming the cabinet 40 is the entire inner surface of the cabinet 40. Therefore, the length of the path through which gas in the space R40 reaches the center of the inside of the plane-plate portion of the cabinet 40 from the inner surface of the cabinet 40 is shorter as compared to the gas adsorber 12, according to the first embodiment, having the rectangular parallelepiped shape determined by molding. Therefore, the cabinet 40 having the shorter length of the path than the gas adsorber 12 allows increased reduction in loss of acoustic energy. As a result, when the total volume (the sum total of volumes of the front wall section 401 and the box section 402) of the gas adsorber forming the cabinet 40 is equal to the volume of the gas adsorber 12, the cabinet 40 formed by the gas adsorber is capable to further suppressing reduction in sound pressure level as compared to the gas adsorber 12. Further, the cabinet 40 is formed by the gas adsorber, and therefore there is an advantage that it is unnecessary to separately provide the gas adsorber.

As described above, in the speaker system 4 according to the present embodiment, the cabinet 40 is formed by the gas adsorber having the structure shown in FIG. 2. Therefore, the speaker system 4 according to the present embodiment is capable of further suppressing reduction in sound pressure level as compared to the speaker system 1 according to the first embodiment. Further, the speaker system 4 according to the present embodiment has an advantage that it is unnecessary to separately provide the gas adsorber.

Further, the shielding component 43 is provided over the entire outer surface of the cabinet 40. Furthermore, the shielding component 43 is made of gas-shielding material. Thus, the cabinet 40 does not contact gas of the outside. The gas adsorber has characteristic that when the gas adsorber contacts and physically adsorbs moisture, cigarette smoke, formaldehyde, and the like, the gas adsorber has the physical adsorbing function deteriorated. However, the shielding component 43 prevents the cabinet 40 formed by the gas adsorber from contacting moisture, cigarette smoke, formaldehyde, and the like contained in gas of the outside. Therefore, according to the present embodiment, even when the cabinet 40 is formed by the gas adsorber, deterioration of physical adsorbing function can be prevented.

Figure 7A:
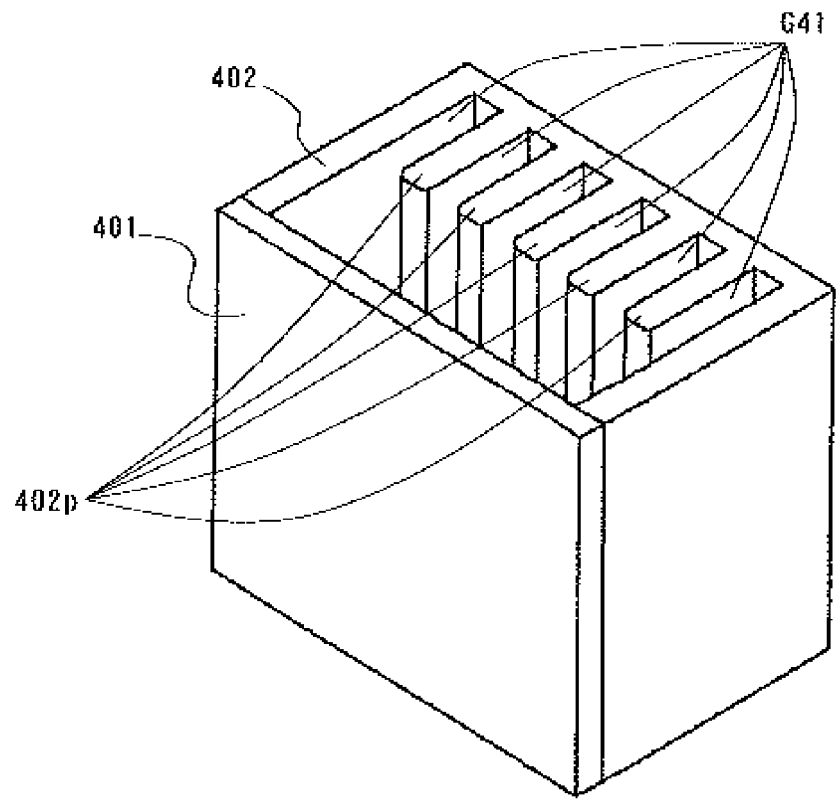
FIG. 7A is a diagram illustrating an example where a plurality of projection sections 402p are formed on a back wall of a box section 402.
Figure 7B:
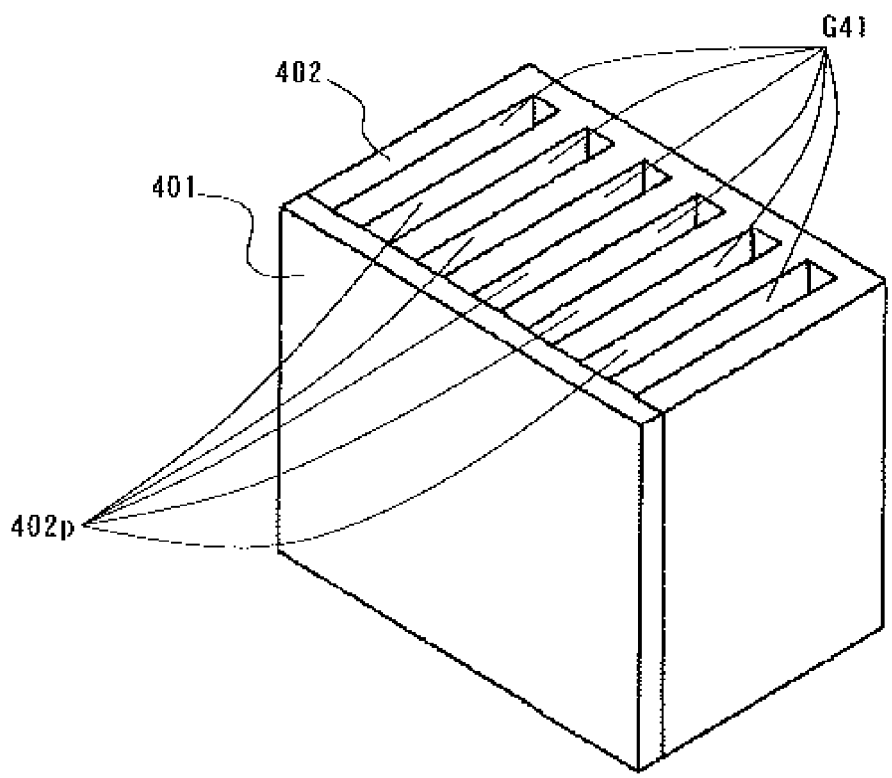
FIG. 7B is a diagram illustrating another example where a plurality of projection sections 402p are formed on a back wall of a box section 402.

As shown in FIG. 7A and FIG. 7B, the back wall of the box section 402 may include a plurality of projection sections 402p each having a plane-plate shape. FIG. 7A is a diagram illustrating an example where the plurality of projection sections 402p are formed on the back wall of the box section 402. FIG. 7B is a diagram illustrating another example where the plurality of projection sections 402p are formed on the back wall of the box section 402. FIG. 7A and FIG. 7B are each a perspective view illustrating the cabinet 40 along lines BB of FIG. 6A as viewed from diagonally above. In FIGS. 7A and 7B, the shielding component 43 is not shown.

In FIG. 7A, the plurality of projection sections 402p are formed on the back wall of the box section 402. The plurality of projection sections 402p, each having a plane-plate shape, are formed on the back wall of the box section 402 so as to project toward the inner portion of cabinet 40. Moreover, the plurality of projection sections 402p are formed on the back wall of the box section 402 such that a plurality of gaps G41 are formed thereamong. The plurality of projection sections 402p formed as described above enables reduction in sound pressure level to be further suppressed as compared to a conventional art, and enables the volume increase effect to be enhanced due to the volume of the projection sections 402p being added.

In FIG. 7B, the edges of the plurality of projection sections 402p are mechanically fixed to or bonded to the front wall section 401, unlike in the example shown in FIG. 7A. Due to this difference, the structural strength of the cabinet 40 shown in FIG. 7B is greater than that of the cabinet 40 shown in FIG. 7A. Vibration of the cabinet 40 caused due to gas pressure changing inside or vibration of the cabinet 40 caused by mechanical vibration of the speaker unit 41 itself may lead to generation of distorted sound. However, the structural strength is enhanced in the cabinet 40 as shown in FIG. 7B, thereby suppressing vibration caused due to the distorted sound in the cabinet 40.

Fifth Embodiment

Figure 8A:
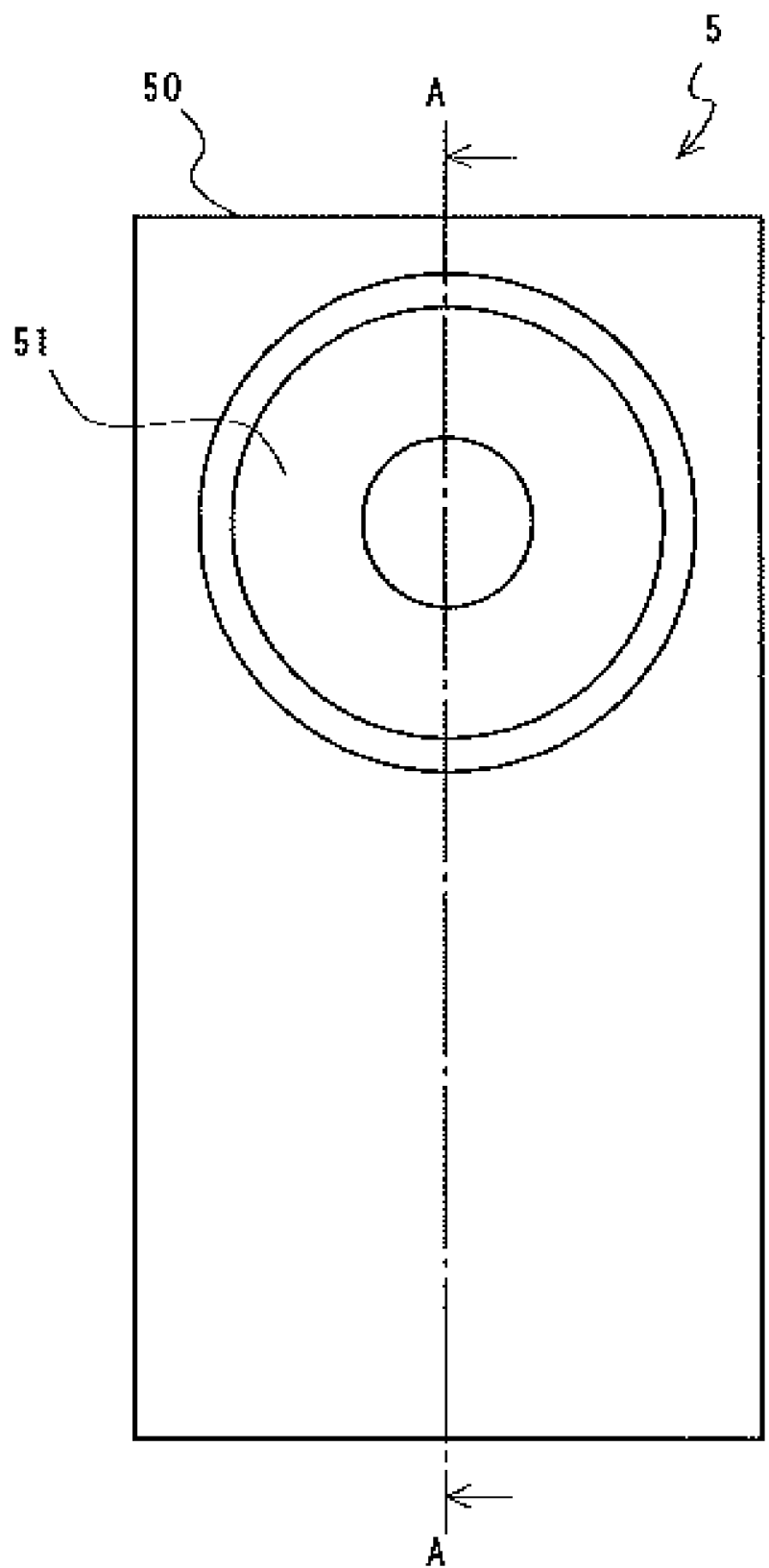
FIG. 8A is an elevation view of a speaker system 5 according to a fifth embodiment.
Figure 8B:
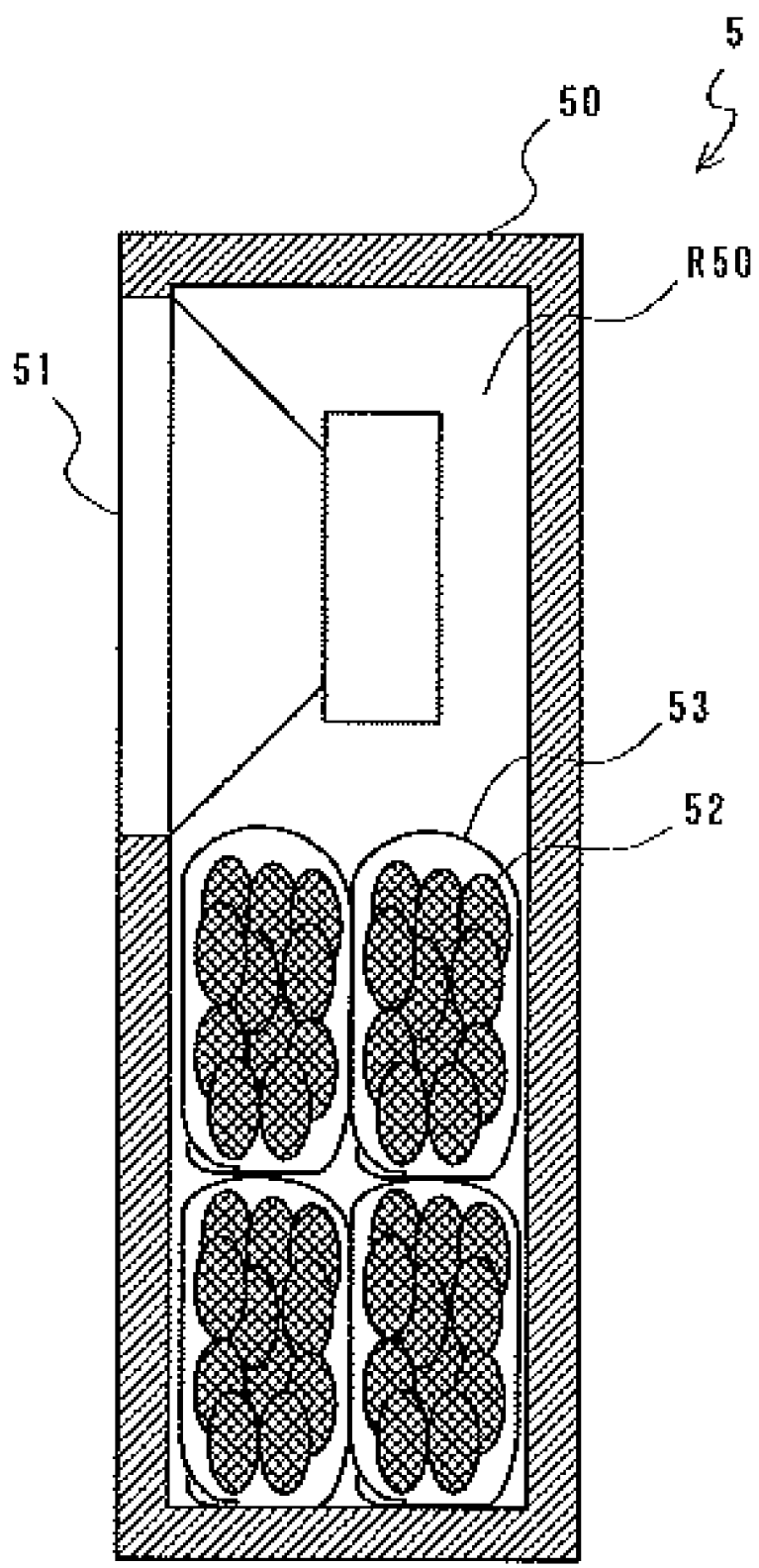
FIG. 8B is a cross-sectional view of the speaker system 5 along lines AA.

A speaker system 5 according to a fifth embodiment of the present invention will be described with reference to FIG. 8A and FIG. 8B. FIG. 8A is an elevation view of the speaker system 5, and FIG. 8B is a cross-sectional view illustrating the speaker system 5 along lines AA. In FIG. 8A and FIG. 8B, the speaker system 5 comprises a cabinet 50, a speaker unit 51, a plurality of gas adsorbers 52, and a plurality of packing components 53. The speaker system 5 is different from the speaker system 1 of the first embodiment in that in the speaker system 5 a plurality of gas adsorbers 52 are used instead of the gas adsorber 12, and the plurality of packing components 53 are additionally provided. Hereinafter, the different points will be mainly described.

The speaker unit 51 is, for example, an electrodynamic speaker, as in the case of the speaker unit 11. The speaker unit 51 is mounted in an opening formed on the front surface of the cabinet 50. The plurality of gas adsorbers 52 each has a peanut shape determined by molding. The plurality of gas adsorbers 52 are collectively packed in each of the plurality of packing components 53. The plurality of packing components 53 each having the plurality of gas adsorbers 52 packed therein are provided in a space R50 inside the cabinet 50. In the example shown in FIG. 8B, the number of the plurality of packing components 53 provided is four. The space R50 is a closed space formed inside the cabinet 50. The plurality of packing components 53 are each made of non-woven fabric having gas permeability.

An operation performed by the speaker system 5 having a configuration as described above will be described. When a music signal is applied to the speaker unit 51, sound is emitted from the front surface and the back surface of the speaker unit 51. The sound emitted from the back surface of the speaker unit 51 is emitted into the space R50. The sound emitted from the back surface of the speaker unit 51 changes gas pressure in the space R50. The operations described above are the same as described for the first embodiment. The fifth embodiment is different from the first embodiment in that in the fifth embodiment the plurality of gas adsorbers 52 each has the peanut shape determined by molding, and are packed in each of the plurality of packing components 53 having gas permeability. Therefore, when the gas pressure changes in the space R50, gas passes through the packing component 53 and is physically adsorbed by the plurality of gas adsorbers 52 packed in each of the plurality of packing components 53. Therefore, the change in gas pressure in the cabinet 50 is suppressed. As a result, this is equivalent to increase of the volume of the inside of the cabinet 50.

The plurality of gas adsorbers 52 each has the peanut shape determined by molding, and the contour of the outer circumference surface of each gas adsorber 52 is curved. Therefore, even when the plurality of gas adsorbers 52 packed in each of the plurality of packing components 53 contact each other, the contact portions thereamong are each almost a point. Therefore, the length of the path through which gas in the space R50 reaches the center of the inside of each gas adsorber 52 from the outer surface thereof is shorter as compared to the gas adsorber 12 having the rectangular parallelepiped shape determined by molding. Accordingly, the plurality of gas adsorbers 52 having the length of the path reduced as compared to the gas adsorber 12 enables increased reduction in loss of acoustic energy. As a result, when the total volume of the plurality of gas adsorbers 52 is equal to the volume of the gas adsorber 12, reduction in sound pressure level is further suppressed in the plurality of gas adsorbers 52 as compared to the gas adsorber 12.

As described above, the speaker system 5 according to the present embodiment comprises the plurality of gas adsorbers 52 each having the peanut shape determined by molding. Therefore, the speaker system 5 according to the present embodiment can further suppress reduction in sound pressure level as compared to the speaker system 1 according to the first embodiment.

Further, the plurality of gas adsorbers 52 packed in each of the plurality of packing components 53 are provided in the space R50 in the cabinet 50. Therefore, when the speaker system 5 is manufactured, the plurality of packing components 53 each including the plurality of gas adsorbers 52 may be previously prepared, thereby enabling reduction of production cost.

Although in the above description the plurality of gas adsorbers 52 each has the peanut shape, the present invention is not limited thereto. Each gas adsorber 52 may have any shape such that the contact portions among the plurality of gas adsorbers 52 contacting each other are each almost a point or a line. For example, each gas adsorber 52 may be sphere-shaped, column-shaped, cone-shaped, or the like. Further, it is more preferable that the size of each gas adsorber 52 is relatively small, for example, ranging from a rice grain size to a peanut size, because, in this case, the length of the path through which gas reaches the center of the inside of each gas adsorber 52 is increasingly reduced.

Although in the above description the plurality of packing components 53 are each made of non-woven fabric having gas permeability, the present invention is not limited thereto. The plurality of packing components 53 may be each formed by the film made of the same material as that of the shielding component 43 according to the fourth embodiment. In this case, the plurality of packing components 53 each formed by the film vibrates due to the sound emitted from the back surface of the speaker unit 51. When a sound generated by the vibration reaches the plurality of gas adsorbers 52, the same volume increase effect as obtained by using the plurality of packing components 53 each made of non-woven fabric is exerted. Moreover, when the speaker system 5 uses a bass reflex type speaker, the plurality of gas adsorbers 52 may directly contact moisture, cigarette smoke, formaldehyde, and the like contained in gas outside the cabinet 50. However, when the plurality of packing components 53 are each formed by the film made of the same material as that of the shielding component 43, the contact of the plurality of gas adsorbers 52 with moisture, cigarette smoke, formaldehyde, and the like can be prevented. Accordingly, deterioration of the physical adsorbing function of the plurality of gas adsorbers 52 can be prevented.

When the plurality of packing components 53 need not provide the advantages, as described above, associated with the manufacturing, or need not prevent deterioration of physical adsorbing function, the plurality of packing components 53 may be eliminated. Further, the gas adsorber described in the first to the third embodiments may be packed in the packing component 53.

Sixth Embodiment

Figure 10:
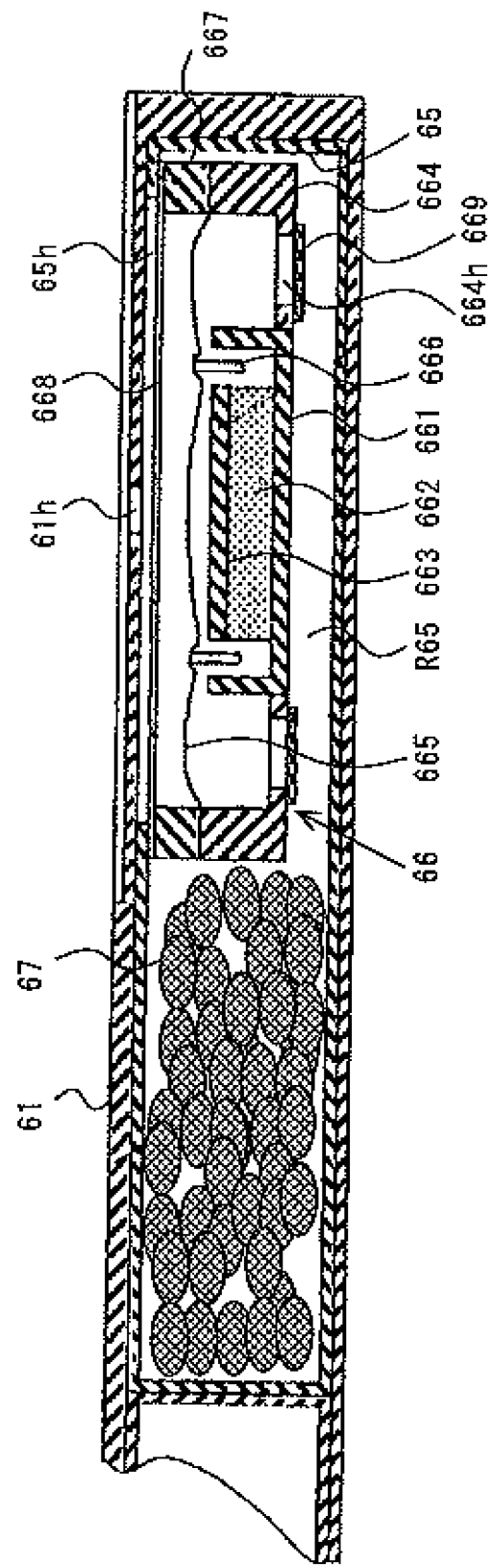
FIG. 10 is a cross-sectional view of the mobile telephone 6 along lines CC of FIG. 9C.

The speaker systems 1 to 5 according to the first to the fifth embodiments, respectively, may be applied to, for example, a mobile terminal apparatus such as a mobile telephone. Another exemplary mobile terminal apparatus is, for example, a portable device such as a HDD player and a semiconductor memory player. Hereinafter, the speaker system of the present invention applied to a mobile telephone 6 corresponding to the mobile terminal apparatus will be described as a sixth embodiment with reference to FIGS. 9A, 9B, 9C, and 10. FIG. 9A is an elevation view of the mobile telephone 6, FIG. 9B is a side view of the mobile telephone 6, and FIG. 9C is a back view of the mobile telephone 6. FIG. 10 is a cross-sectional view illustrating the mobile telephone 6 along lines CC of FIG. 9C.

The mobile telephone 6 is a foldable mobile telephone. In FIGS. 9A, 9B, and 9C, the mobile telephone 6 mainly includes a device casing 61, a liquid crystal screen 62, a hinge section 63, and an antenna 64. The liquid crystal screen 62 is mounted in the device casing 61. As shown in FIG. 9C, a sound hole 61h for emitting a sound to the outside from the speaker system provided inside is formed on the back surface of the device casing 61.

The speaker system comprises a cabinet 65, a speaker unit 66, and gas adsorbers 67, as shown in FIG. 10. The cabinet 65 has an opening 65h formed therein. The speaker unit 66 is an electrodynamic speaker, and mounted in an opening 65h formed in the cabinet 65. The gas adsorbers 67 are the same as the gas adsorbers 52 as described in the fifth embodiment. The plurality of the gas adsorbers 67 are provided in the cabinet 65. A closed space formed in the cabinet 65 is referred to as a space R65.

The speaker unit 66 includes a yoke 661, a magnet 662, a plate 663, a frame 664, a diaphragm 665, a voice coil 666, a gasket 667, a first dustproof net 668, and a second dustproof net 669. The yoke 661 is fixed in an opening formed at the center of the bottom of the frame 664, and is integrated with the frame 664. The magnet 662 is fixed to the upper surface of the bottom of the yoke 661. The plate 663 is fixed to the upper surface of the magnet 662. The outer circumference portion of the diaphragm 665 is fixed to the upper surface of the outer circumference portion of the frame 664. A magnetic gap is formed between the yoke 661 and the plate 663. The voice coil 666 is fixed to the bottom surface of the diaphragm 665 such that the voice coil 666 is positioned in the magnetic gap. The gasket 667 is fixed to the upper surface of the outer circumference portion of the diaphragm 665. The outer circumference portion of the first dustproof net 668 is fixed to the upper surface of the gasket 667. Thus, when the diaphragm 665 vibrates, the gasket 667 prevents contact between the diaphragm 665 and the first dustproof net 668. The second dustproof net 669 is provided on the bottom surface of the frame 664 so as to cover a sound hole 664h formed on the bottom of the frame 664.

An operation performed by the mobile telephone 6 having the configuration described above will be described. The speaker unit 66 is an electrodynamic speaker, and the operation performed by the electrodynamic speaker is widely known. Therefore, the operation performed by the electrodynamic speaker will be briefly described. The yoke 661, the magnet 662, and the plate 663, all of which form a magnetic circuit, and the voice coil 666 function as a driving force generation means for the speaker unit 66. For example, when the mobile telephone 6 receives a reception signal from the antenna 64, the reception signal is processed by a signal processing section (not shown) as necessary, and inputted to the speaker unit 66. When, for example, a melody signal for reception and calling is applied to the speaker unit 66, a driving force is generated in the voice coil 666. The diaphragm 665 vibrates by the driving force, and a melody sound is emitted from the diaphragm 665. The melody sound emitted from the upper surface of the diaphragm 665 passes through the first dustproof net 668, and is then emitted to the outside of the device through a plurality of sound holes 61h formed on the device casing 61. On the other hand, the sound emitted from the bottom surface of the diaphragm 665 passes through the sound hole 664h and the second dustproof net 669, and is then emitted into the space R65. The sound emitted from the bottom surface of the diaphragm 665 changes gas pressure in the space R65. However, the cabinet 65 includes the plurality of gas adsorbers 67 therein. Therefore, the change of gas pressure in the space R65 is suppressed by the physical adsorption performed by the gas adsorbers 67, so as to suppress the change in gas pressure. As a result, this is equivalent to increase of the volume of the inside of the cabinet 65.

The gas adsorbers 67 are the same as the gas adsorbers 52 according to the fifth embodiment. Therefore, it is possible to provide the mobile telephone 6 capable of reproducing, even when the device casing 61 is small, low frequency sound while suppressing the reduction of sound pressure level as compared to a conventional art.

In the present embodiment, the gas adsorbers 67 are provided, as they are, in the space R65. The sound hole 664h formed in the frame 664 is covered by the second dustproof net 669. Therefore, even when each gas adsorber 67 is smaller than the sound hole 664h, the entry of the gas adsorber 67 into the frame 664 is prevented. Therefore, the gas adsorbers 67 do not contact the diaphragm 665 and/or the voice coil 666, thereby preventing generation of abnormal sound due to the contact.

Further, although in the present embodiment the gas adsorbers 67 are the same as the gas adsorbers 52 according to the fifth embodiment, the gas adsorber 67 may be the same as the gas adsorber according to any of the other embodiments.

Seventh Embodiment

Figure 11:
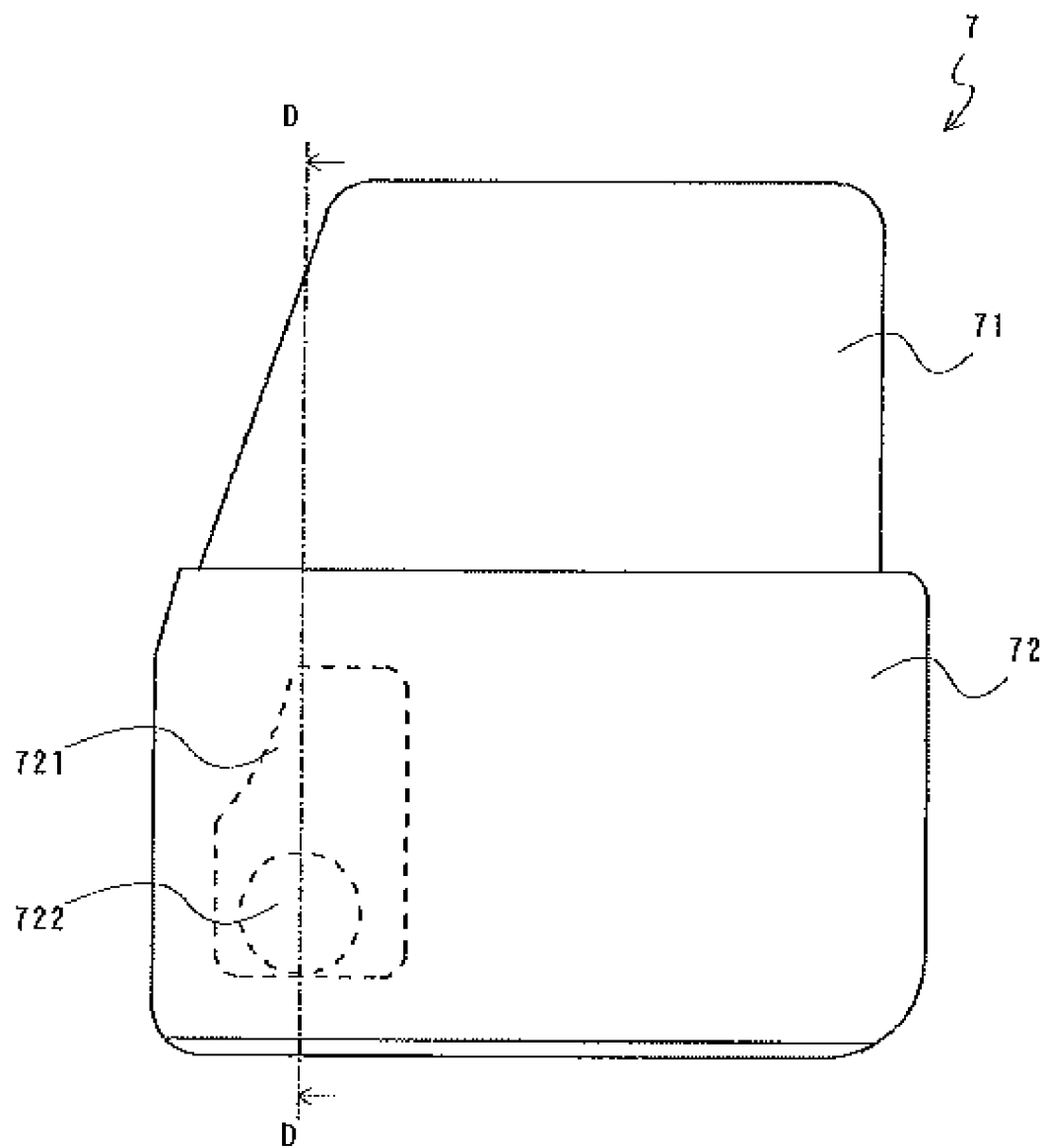
FIG. 11 is a diagram illustrating an outer appearance of a vehicle door 7.
Figure 12:
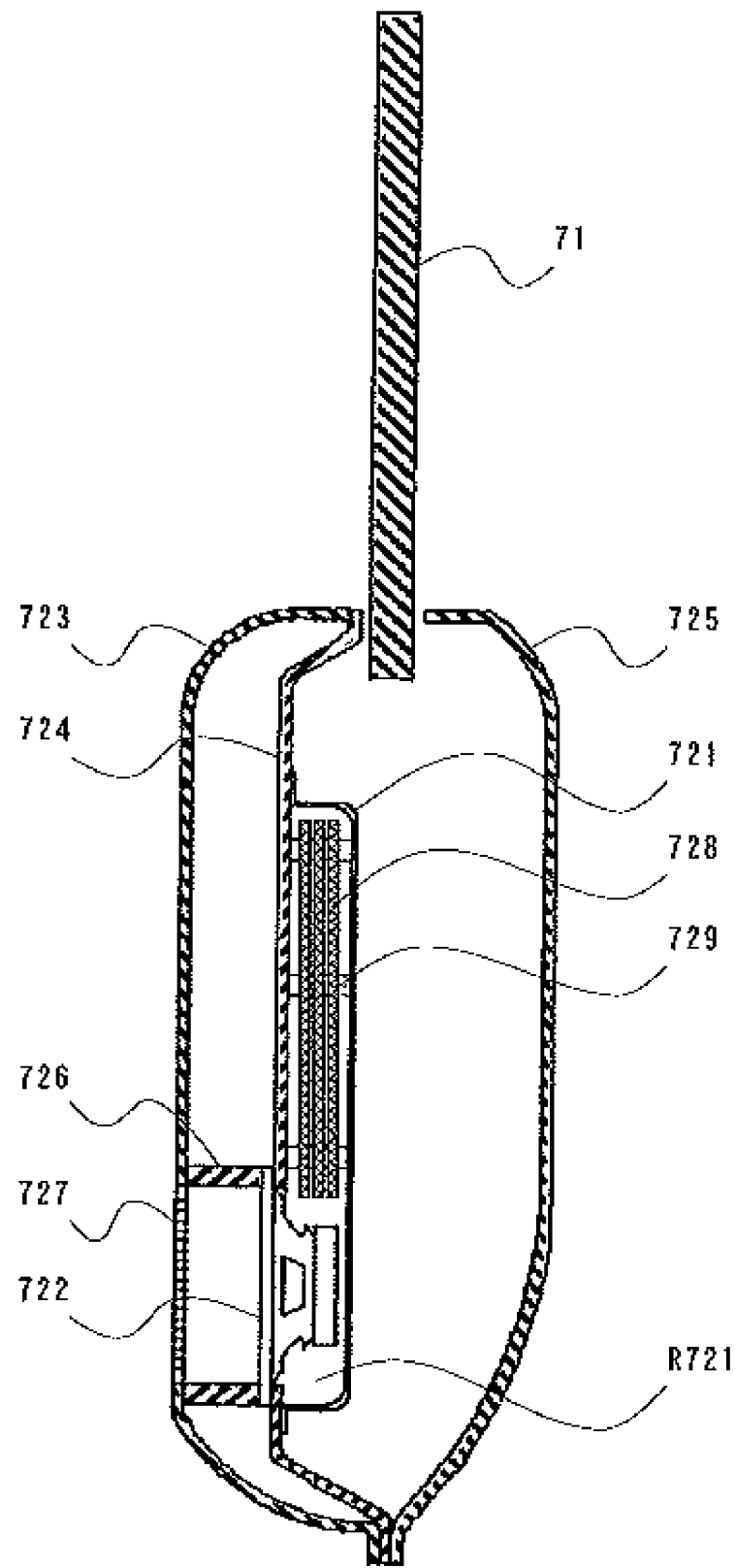
FIG. 12 is a cross-sectional view of the vehicle door 7 along lines DD of FIG. 11.

The speaker systems 1 to 5 according to the first to the fifth embodiments, respectively, may be applied to a speaker system mounted in, for example, an interior of a vehicle such as a car. For example, the interior of the vehicle may be a door for a vehicle. Hereinafter, a seventh embodiment in which the speaker system according to the present invention is applied as a speaker system mounted in a car door will be descried with reference to FIG. 11 and FIG. 12. FIG. 11 is a diagram illustrating an outer appearance of a vehicle door 7. FIG. 12 is a cross-sectional view of the vehicle door 7 along lines DD of FIG. 11.

In FIG. 11 and FIG. 12, the vehicle door 7 mainly includes a window glass 71 and a door body 72. The door body 72 includes a cabinet 721, a speaker unit 722, an inner wall 723, an inner panel 724, an outer panel 725, an acoustic tube 726, a grille 727, a plurality of gas adsorbers 728, and supporting components 729.

The window glass 71 is provided between the inner panel 724 and the outer panel 725 so as to move up and down. The inner panel 724 is provided between the inner wall 723 and the outer panel 725. The inner panel 724 includes an opening having almost the same size as the speaker unit 722, and the speaker unit 722 is mounted in the inner panel 724 so as to engage the opening. The speaker unit 722 is, for example, an electrodynamic speaker. The front surface of the speaker unit 722 faces the inner wall 723. The grille 727 is mounted in an opening formed on the inner wall 723. One edge of the acoustic tube 726 is mounted to the outer circumference portion of the front surface of the speaker unit 722, and the other edge of the acoustic tube 726 is mounted to the outer circumference portion of the opening formed on the inner wall 723. Thus, inner surface of the acoustic tube 726 and the grille 727 form a space in front of the speaker unit 722.

The cabinet 721 is shaped as a box having one open side. The cabinet 721 is provided in a space between the inner panel 724 and the outer panel 725, and is mounted in the inner panel 724 so as to surround the speaker unit 722. A space R721 is a closed space formed in the cabinet 721. The plurality of gas adsorbers 728 are the same as the plurality of gas adsorbers 22 according to the second embodiment, and each has a plane-plate shape determined by molding. The plurality of gas adsorbers 728 are positioned in the space R721 inside the cabinet 721 such that the plurality of gas adsorbers 728 are piled in the thickness direction of the plurality of gas adsorbers 728, and a gap is formed between any adjacent gas adsorbers 728. The supporting components 729 support the gas adsorbers 728 so as to form the gap between any adjacent gas adsorbers 728.

An operation performed by the speaker system which is mounted in the vehicle door 7 and has the configuration described above will be described. When a music signal is applied to the speaker unit 722 from an audio device (not shown) such as a CD player provided in a vehicle, sound is emitted from the front surface of the back surface of the speaker unit 722. The sound emitted from the back surface of the speaker unit 722 is emitted into the space R721. The sound emitted from the back surface of the speaker unit 722 changes gas pressure in the space R721. However, the cabinet 721 includes the plurality of gas adsorber 728 therein. Therefore, when gas pressure changes in the space R721, gas is physically adsorbed by the plurality of gas adsorbers 728, so as to suppress the change in gas pressure. As a result, this is equivalent to increase of the volume of the inside of the cabinet 721.

The plurality of gas adsorbers 728 are the same as the plurality of gas adsorbers 22 according to the second embodiment. Thus, it is possible to provide the speaker system capable of reproducing, while suppressing reduction of sound pressure level as compared to a conventional art, low frequency sound even when the speaker system is mounted in a vehicle door having a limited internal volume of the cabinet.

Although in the present embodiment the speaker system (the cabinet 721, the speaker unit 722, the gas adsorbers 728, and the supporting components 729) is provided in a space between the inner panel 724 and the outer panel 725, the present invention is not limited thereto. The speaker system may be provided in a space between the inner panel 724 and the inner wall 723.

Although in the present embodiment the speaker system is mounted in the vehicle door 7, the present invention is not limited thereto. The speaker system may be mounted in a front panel, a rear tray, a ceiling of a vehicle body, or the like. Further, the gas adsorber according to the present invention may have any shape determined by molding. Therefore, in particular, when the cabinet or/and the gas adsorber needs to have such a shape as to meet the interior of a vehicle, the present invention has an advantage that space can be saved.

Eighth Embodiment

Figure 13:
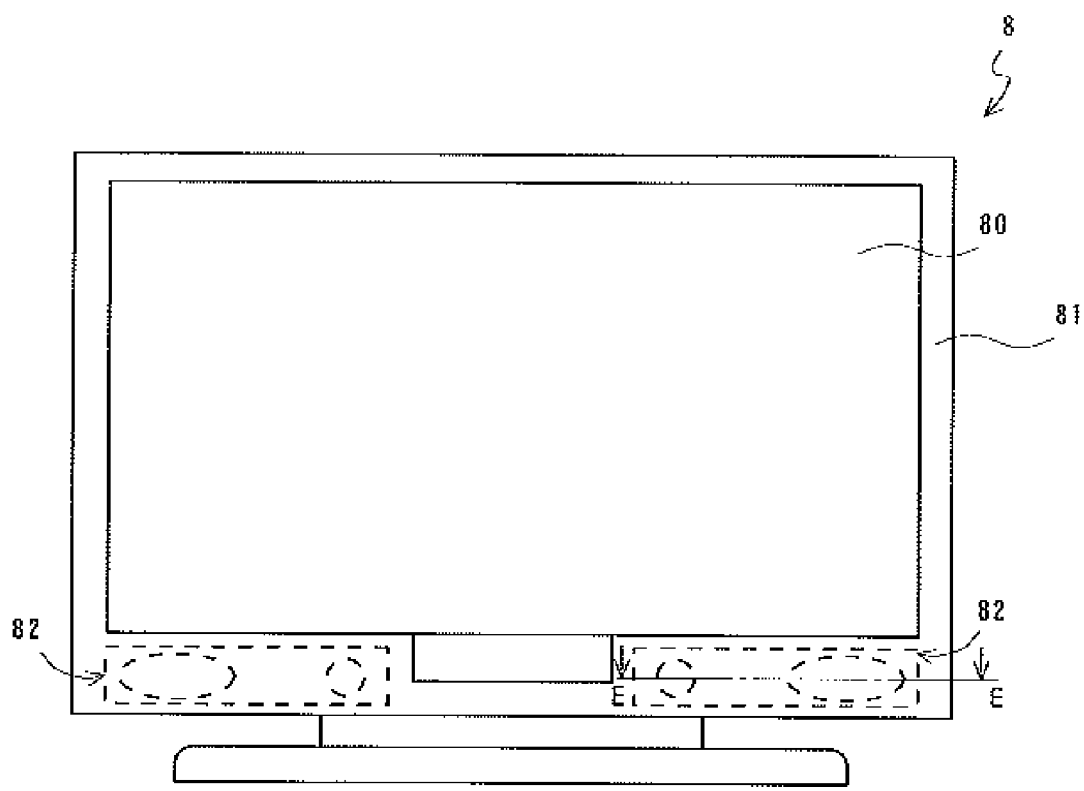
FIG. 13 is an elevation view of a thin-screen television 8.
Figure 14:
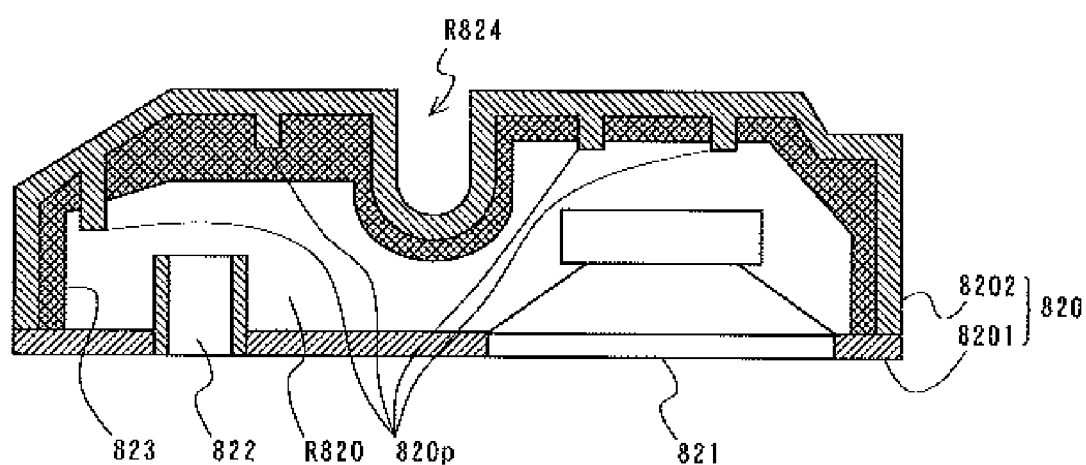
FIG. 14 is a cross-sectional view illustrating a speaker systems 82 along lines EE of FIG. 13.

The speaker systems 1 to 5 according to the first to the fifth embodiments, respectively, may be applied as a speaker system mounted in a video apparatus such as a thin-screen television. Hereinafter, an eighth embodiment in which the speaker system according to the present invention is applied as a speaker system mounted in a thin-screen television will be described with reference to FIG. 13 and FIG. 14. FIG. 13 is an elevation view of a thin-screen television 8. FIG. 14 is a cross-sectional view of a speaker system 82 along lines EE of FIG. 13.

In FIG. 13, the thin-screen television 8 includes a liquid crystal screen 80, a device casing 81, and two speaker systems 82. The speaker systems 82 are provided inside the device casing 81. Specifically, the speaker systems 82 are positioned below the liquid crystal screen 80. In FIG. 14, the speaker systems 82 each includes a cabinet 820, a speaker unit 821, a bass reflex port 822, and a gas adsorber 823. The speaker unit 821 is, for example, an electrodynamic speaker. The cabinet 820 includes a front wall section 8201 having formed thereon openings for mounting the speaker unit 821 and the bass reflex port 822, respectively, and a box section 8202 having side walls and a back wall. A closed space formed inside the cabinet 820 is referred to as a space R820. The space R820 is acoustically connected to the outside of the cabinet 820 through the bass reflex port 822. The box section 8202 has a plurality of projection portions 820p formed thereon. The plurality of projection portions 820p are each formed on the box section 8202 so as to project toward the inside of the cabinet 820. Further, the box section 8202 includes a space R824 formed by a projection section provided on the center of the back surface thereof. The space R824 is a space through which a supporting post for supporting the liquid crystal screen 80 stands. The gas adsorber 823 is a gas adsorber having the structure as shown in FIG. 2, and has a shape determined by molding such that the gas adsorber 823 is provided along the contour of the entire inner surface of the box section 8202, as in the case of the gas adsorber 32 according to the third embodiment. The gas adsorber 823 is fixed to the inner surface of the box section 8202. The gas adsorber 823 has formed thereon through holes and an indentation portion which can engage the plurality of projection portions 820p, respectively.

An operation performed by the speaker system which has the configuration described above and is mounted in the thin-screen television 8 will be described. When an acoustic signal is applied to the speaker unit 821 from an audio circuit (not shown), sound is emitted from the front surface and the back surface of the speaker unit 821. The sound emitted from the back surface of the speaker unit 821 is emitted into the space R820. The sound emitted from the back surface of the speaker unit 821 changes gas pressure in the space R820. However, the cabinet 820 includes the gas adsorber 823 therein. Therefore, when gas pressure changes in the space R820, gas is physically adsorbed by the gas adsorber 823 so as to suppress the change in gas pressure. As a result, this is equivalent to increase of the volume of the inside of the cabinet 820.

The gas adsorber 823 is a gas adsorber having the structure as shown in FIG. 2. Therefore, it is possible to provide a thin-screen television having the speaker system capable of reproducing low frequency sound while suppressing reduction of sound pressure level as compared to a conventional art.

Further, the speaker systems 82 are positioned in a spare space of the device casing 81. Therefore, the shape of the cabinet 820 of each speaker system 82 is not a rectangular parallelepiped used for a typical Hi-Fi speaker system, and the cabinet 820 has a wall surface having indentations and projections, and/or tilt. The cabinet 820 for use in the thin-screen television 8 often has a complicated shape. However, the gas adsorber 823 is formed, as one component, by molding so as to fit a complicated shape of the box section 8202. Thus, it is possible to provide the gas adsorber 823 inside the cabinet 820 with enhanced easiness.

Moreover, increased reduction of the thickness of the thin-screen television 8 is required. The gas adsorber 823 is formed by molding so as to fit the shape of the box section 8202. Accordingly, the size of the gas adsorber 823 can be increased as compared to a case where a plurality of gas adsorbers each having a plane-plate shape determined by molding are used, because portions other than the plane surface portions of the back wall of the box section 8202 can be used for the gas adsorber 823. As a result, the volume increase effect can be increasingly enhanced by using the gas adsorber 823. Thus, even when the volume of the inside of the cabinet 820 is reduced, the same volume increase effect as obtained by using a plurality of gas adsorbers each of which has a plane-plate shape determined by molding and has the structure shown in FIG. 2 can be obtained. In a thin-screen television having, for example, a liquid crystal display or a PDP which is becoming thinner and thinner, reduction of thickness and size of the thin-screen television may be prevented due to the volume of the speaker system for use therein. Accordingly, it is possible to use the speaker system of the present invention as a speaker system which is particularly applicable to the thin-screen television.

Although in the present embodiment the speaker systems 82 are provided below the liquid crystal screen 80, the speaker systems 82 may be provided to both sides of the liquid crystal display 80.

The gas adsorber according to each of the first to the eighth embodiments may be used as building component for sound absorption and/or sound shielding.

INDUSTRIAL APPLICABILITY

The speaker system according to the present invention is a speaker system capable of reproducing, even when a cabinet is small, low frequency sound while suppressing reduction of sound pressure level as compared to a conventional art, and is applied to a liquid crystal television and a PDP (plasma display) becoming thinner and thinner, a stereo device, a home theater speaker for 5.1 channel reproduction, a mobile terminal apparatus, an in-vehicle audio device, and the like.

The invention claimed is:

1. A speaker system comprising:
a cabinet;
a speaker unit mounted in the cabinet;
a porous material including a plurality of grains and arranged within the cabinet; and
a binder arranged between the plurality of grains of the porous material,
wherein by the binder being arranged between the plurality of grains of the porous material, a gap formed between the plurality of grains of the porous material is increased in size as compared to a gap formed between the plurality of grains of the porous material when the binder is not arranged between the plurality of grains of the porous material.

2. The speaker system according to claim 1, wherein the porous material is made of one selected from the group consisting of an activated carbon, zeolite, silica ($SiO_2$), alumina ($Al_2O_3$), zirconia ($ZrO_2$), magnesia ($MgO$), iron oxide black ($Fe_3O_4$), molecular sieve, fullerene, and carbon nanotube.

3. The speaker system according to claim 1, wherein the binder is one of a powdery resin material and a fibrous resin material.

4. The speaker system according to claim 1,
wherein a gas adsorber including the porous material and the binder has a predetermined shape determined by the molding, and
wherein the gas adsorber is positioned inside the cabinet.

5. The speaker system according to claim 4,
wherein a plurality of the gas adsorber each having a plane-plate shape determined by the molding are positioned inside the cabinet, and
wherein the plurality of the gas adsorber are positioned inside the cabinet such that the plurality of the gas adsorber are piled in a thickness direction of the gas adsorber so as to form a gap between any adjacent gas adsorbers among the plurality of the gas adsorber.

6. The speaker system according to claim 4,
wherein a plurality of the gas adsorber each having a corrugated plate shape determined by the molding are positioned inside the cabinet, and
wherein the plurality of the gas adsorber are positioned inside the cabinet such that the plurality of the gas adsorber are piled in a direction of an amplitude represented by a wave of a corrugated plate shape so as to form a plurality of gaps between any adjacent gas adsorbers among the plurality of the gas adsorber.

7. The speaker system according to claim 4, wherein the gas adsorber has a shape determined by the molding such that (i) the gas adsorber is provided along an inner surface of the cabinet and (ii) the gas adsorber is fixed to the inner surface of the cabinet.

8. The speaker system according to claim 7,
wherein a projection portion projecting toward an inside of the cabinet is formed on the inner surface of the cabinet, and
wherein the gas adsorber includes one of a through hole and an indentation portion being engageable with the projection portion.

9. The speaker system according to claim 4, wherein a plurality of the gas adsorber having a spherical shape determined by the molding are positioned inside the cabinet.

10. The speaker system according to claim 9, further comprising a packing component for collectively packing the plurality of the gas adsorber.

11. The speaker system according to claim 10, wherein the packing component is made of a gas-shielding material.

12. The speaker system according to claim 1,
wherein a gas adsorber including the porous material and the binder forms the cabinet having a closed space formed therein.

13. The speaker system according to claim 12, comprising a shielding component positioned on an entire outer surface of the cabinet, for acting as a gas-shielding component.

14. A mobile terminal apparatus comprising:
the speaker system according to claim 1; and
a device casing for mounting the speaker system therein.

15. A vehicle comprising:
the speaker system according to claim 1; and
a vehicle body for mounting the speaker system therein.

16. A video apparatus comprising:
the speaker system according to claim 1; and
a device casing for mounting the speaker system therein.

* * * * *